United States Patent [19]

Barsamian

[11] 3,713,107

[45] Jan. 23, 1973

[54] FIRMWARE SORT PROCESSOR SYSTEM

[75] Inventor: Harut Barsamian, Torrance, Calif.

[73] Assignee: The National Cash Register Company, Dayton, Ohio

[22] Filed: April 3, 1972

[21] Appl. No.: 240,557

Related U.S. Application Data

[63] Continuation-in-part of Ser. No. 34,397, May 4, 1970, abandoned.

[52] U.S. Cl. ....................340/172.5

[51] Int. Cl. ....................G06f 9/14

[58] Field of Search ....................340/172.5

[56] References Cited

UNITED STATES PATENTS

| | | | |
|---|---|---|---|
| 3,332,069 | 7/1967 | Joseph | 340/172.5 |
| 3,544,966 | 12/1970 | Harmon | 340/172.5 |
| 3,350,694 | 10/1967 | Kusnick | 340/172.5 |
| 3,290,659 | 12/1966 | Fuller | 340/172.5 |
| 3,480,914 | 11/1969 | Schlaeppi | 340/172.5 |
| 3,540,000 | 11/1970 | Bencher | 340/172.5 |
| 3,427,596 | 2/1969 | Hertz | 340/172.5 |
| 2,907,003 | 9/1959 | Hobbs | 340/172.5 X |
| 3,636,519 | 1/1972 | Heath | 340/172.5 |

*Primary Examiner*—Raulfe B. Zache
*Assistant Examiner*—Sydney R. Chirlin
*Attorney*—J. T. Cavender et al.

[57] ABSTRACT

A system and architecture is disclosed for an electronic data processing system wherein the usage of a central processing unit in the system may be reduced and much of its work efficiently handled by a cooperating Sort Processor. The Sort Processor is an internally programmed black box unit that can be connected to the memory bus of almost any computer. It performs background sorting functions in real time or on-line installations, or operates as a stand-alone low priority processor in a uni-processor or multi-processor installation. A Control Program initiates the action of the sort processor so that it operates autonomously and performs the functions of the "sort routine" in both internal sort and merge phases resulting in the saving of considerable Central Processing Unit time, main memory space, and simplification and reduction of programming efforts. The Sort Processor consists of search memory for storing the initial parameters of the sort operation, and a control memory for micro-program storage.

17 Claims, 37 Drawing Figures

WHERE:
$m$ = WORD CAPACITY OF THE MAIN MEMORY

INVENTOR
HARUT BARSAMIAN
BY Louis A Kline
Joseph R Dwyer
HIS ATTORNEYS

INVENTOR
HARUT BARSAMIAN
BY Louis A. Kline
Joseph R. Dwyer
HIS ATTORNEYS

INVENTOR
HARUT BARSAMIAN
BY Louis A Kline
Joseph L Dwyer
HIS ATTORNEYS

INVENTOR
HARUT BARSAMIAN
BY Louis A Kline
Joseph R Dwyer
HIS ATTORNEYS

INVENTOR
HARUT BARSAMIAN

BY Louis A Kline
Joseph R Dwyer
HIS ATTORNEYS

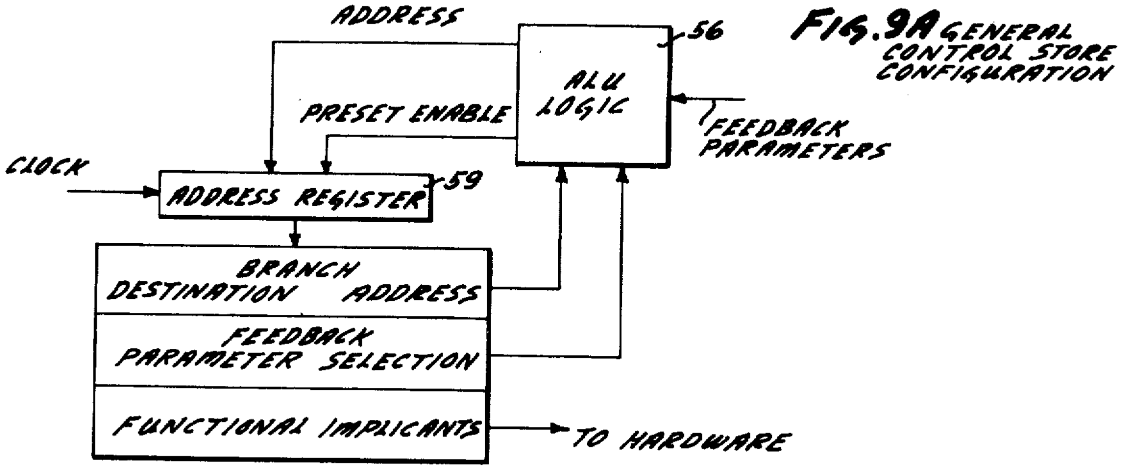
FIG. 9A GENERAL CONTROL STORE CONFIGURATION
FIG. 9B BASIC MICROINSTRUCTION FORMAT
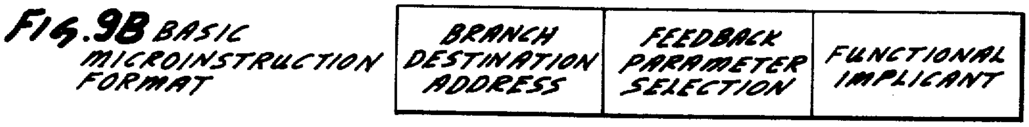
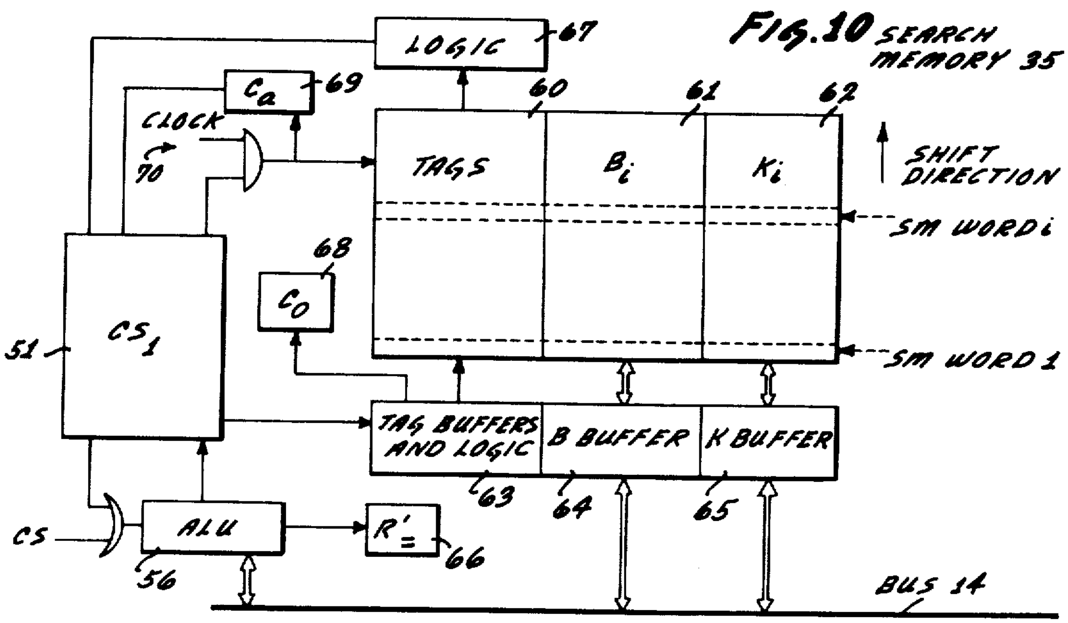
FIG. 10 SEARCH MEMORY 35
FIG. 11 SEARCH MEMORY WORD FORMAT
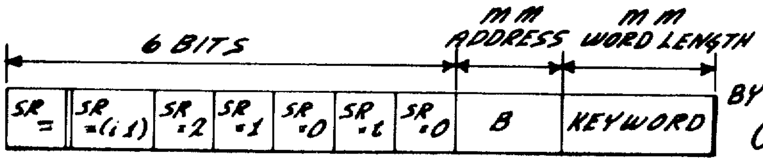
INVENTOR
HARUT BARSAMIAN
BY
HIS ATTORNEYS

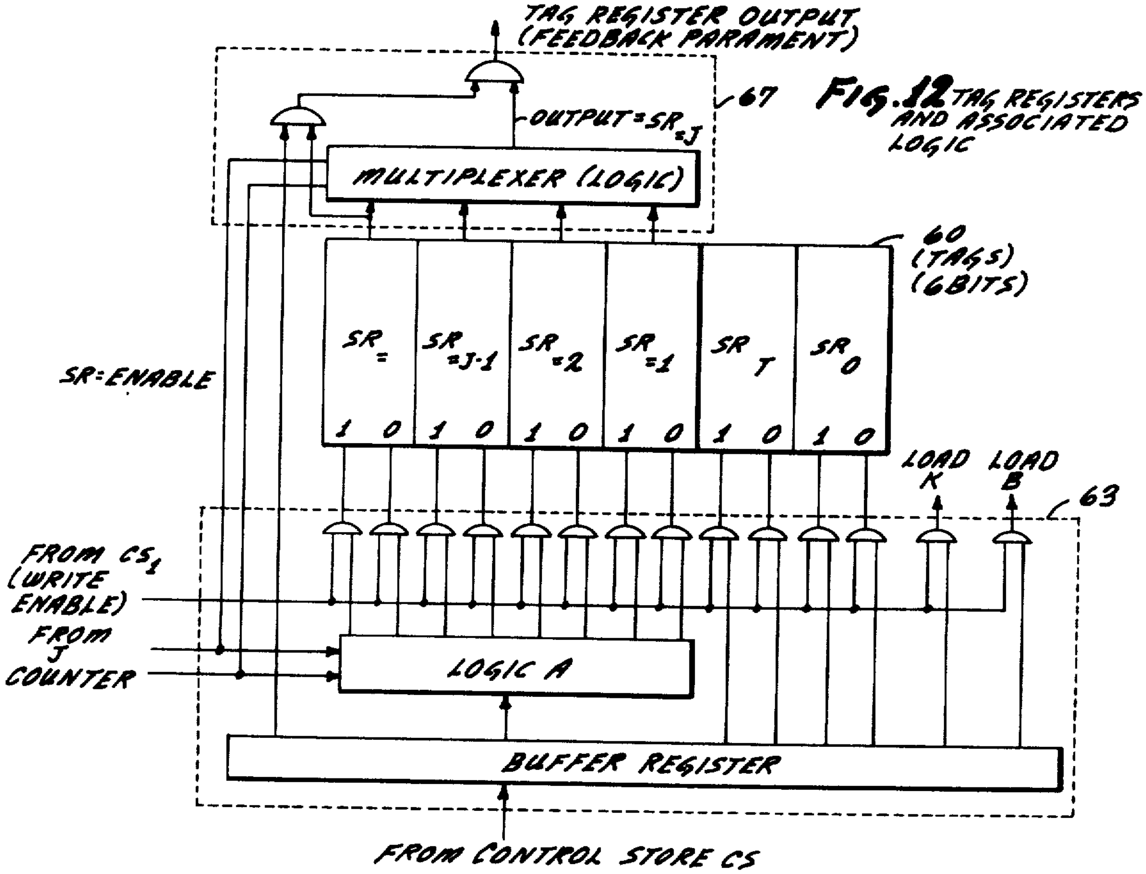
FIG. 12 TAG REGISTERS AND ASSOCIATED LOGIC
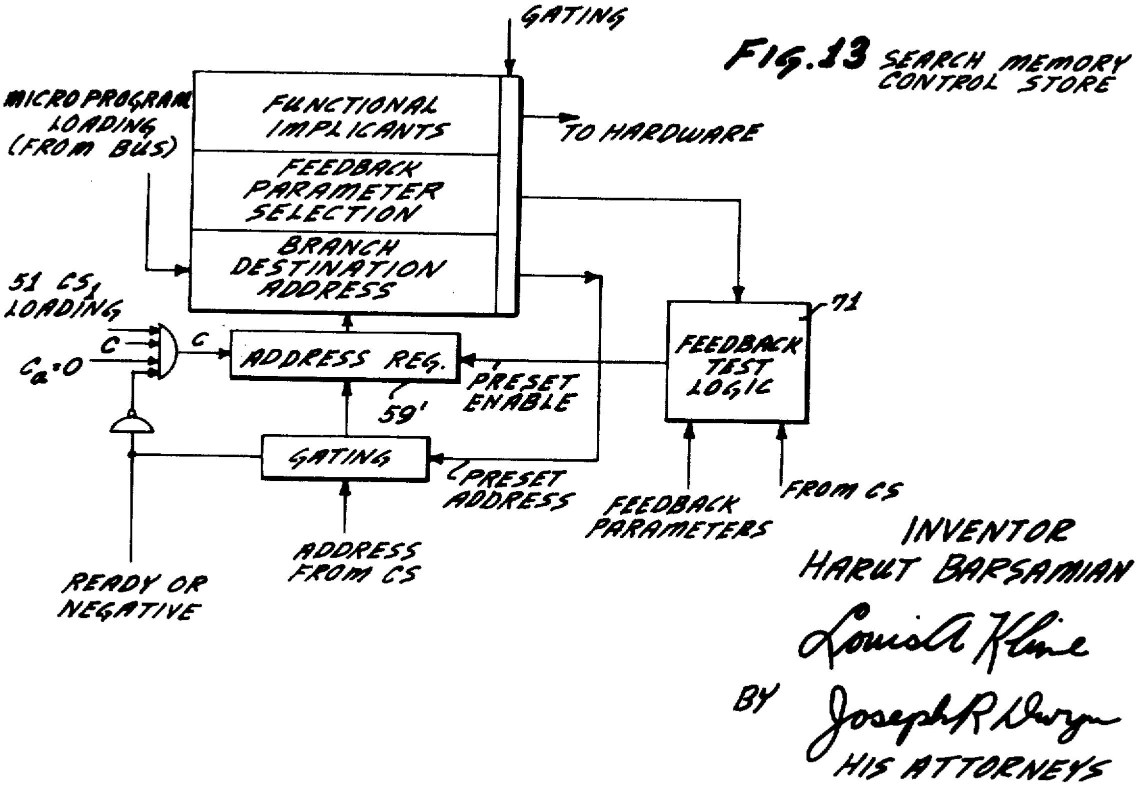
FIG. 13 SEARCH MEMORY CONTROL STORE
INVENTOR
HARUT BARSAMIAN
Louis A Kline
BY Joseph R Dwyer
HIS ATTORNEYS INVENTOR
HARUT BARSAMIAN
Louis A Kline
BY Joseph R Dwyer
HIS ATTORNEYS

FIG. 15 $CS_1$ CODING AND MICROINSTRUCTION FORMAT

| $CS_1$ ADDRESS | FUNTIONAL IMPLICANTS | FEEDBACK SELECTION | BRANCH DESTINATION | COMMAND |
|---|---|---|---|---|
| 0000 | 01000000 | 001 | 0010 | FIND LARGEST (SMALLEST) KEY |
| 0001 | 00000010 | 0000 | 0000 | |
| 0010 | 10000000 | 010 | 0100 | |
| 0011 | 00000100 | 0000 | 0000 | |
| 0100 | 01 | 101 | 0010 | |
| 0101 | | | | |
| 0110 | x10000000 | 1001 | 1000 | CONTENT SEARCH |
| 0111 | 00000010 | 0000 | 0000 | |
| 1000 | 00011100 | 0000 | 0000 | |
| 1001 | | | | LOAD |
| 1010 | 00000000 | 000 | 1100 | |
| 1011 | 00000010 | 000 | 0000 | |
| 1100 | 00001000 | 000 | 0000 | |
| 1101 | 00000100 | | | |
| 1110 | 00001000 | 000 | 0000 | UNCONDITIONAL SM CYCLE/ |
| 1111 | 00000100 | 000 | 0000 | |

ALU ENABLE
$R_2$ GATE
STOP SM CLOCK
LOAD ENABLE
READY
NEGATIVE

FEEDBACK CODE
U.J. - 101
$SR_A$ - 000
TAGS - 001
, - 100

FIG. 16B
$CS_2$ INSTRUCTION FORMAT

| ADDRESS | FUNCTIONAL IMPLICANTS | | | | | | FEEDBACK SELECTION | |
|---|---|---|---|---|---|---|---|---|
| 000 | 1 | | | | 1 | | 01 | READ MM |
| 001 | | | | 1 | | | 10 | |
| 010 | | | | | | 1 | 00 | |
| 011 | | | | | | | | |
| 100 | | 1 | 1 | | 1 | | 01 | WRITE MM |
| 101 | | | | | | 1 | 00 | |
| 110 | | | | | | | | |
| 111 | | | | | | | | |
| | READ MM | WRITE MM | $R_D$-MM GATE | MM-$R_D$ GATE | $R_A$ GATE | READY | | |

$CS_2$ FORMAT (BIT DIRECTION)

$CS_2$ CODING AND μ INSTRUCTION FORMAT

FEEDBACK CODE
00 - NONE
01 - MM AVAIL.
10 - DATA READY
11 -

INVENTOR
HARUT BARSAMIAN
BY Louis A. Kline
Joseph R. Dwyer
HIS ATTORNEYS

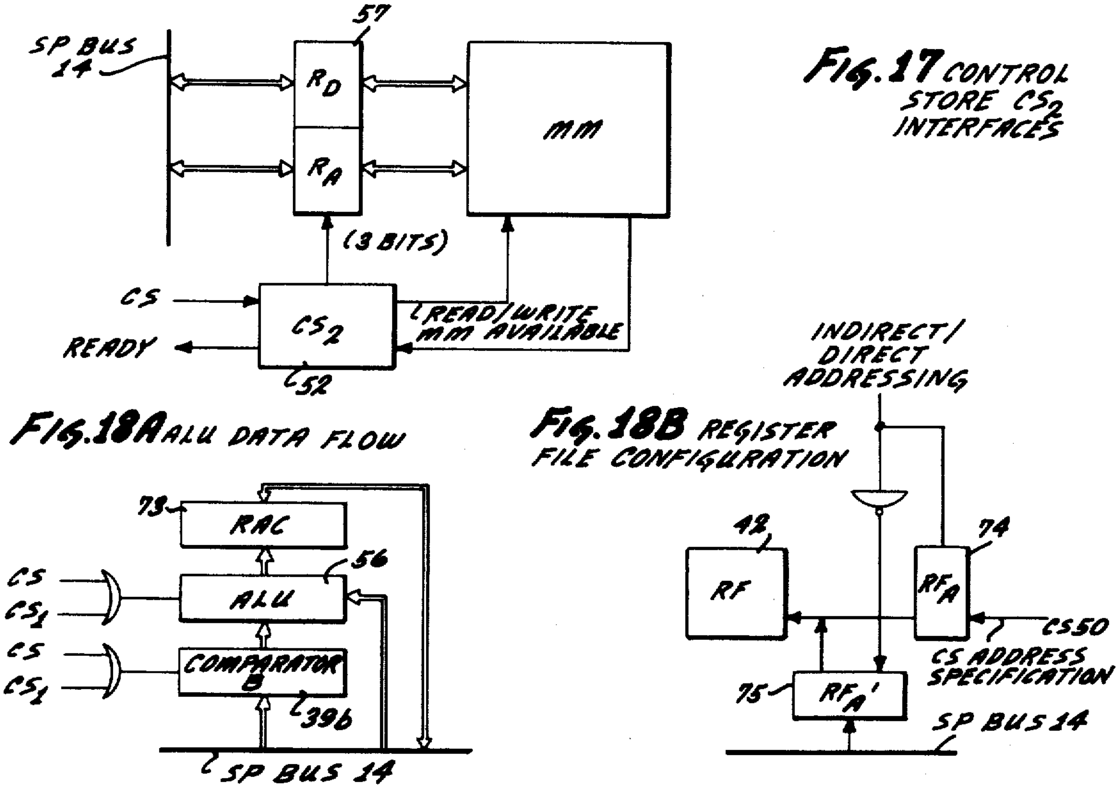
FIG. 17 CONTROL STORE CS2 INTERFACES, FIG. 18A ALU DATA FLOW, FIG. 18B REGISTER FILE CONFIGURATION
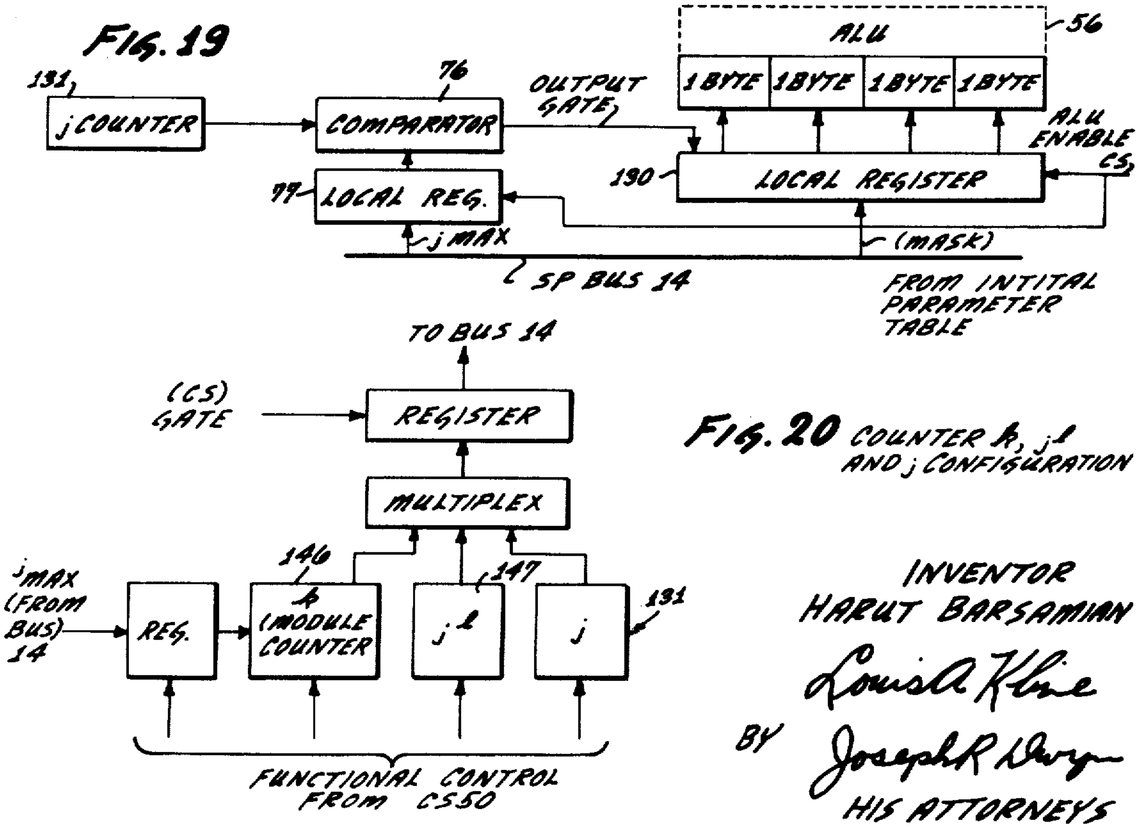
FIG. 19, FIG. 20 COUNTER k, j1 AND j CONFIGURATION
INVENTOR
HARUT BARSAMIAN
BY Louis A Kline
Joseph R Dwyer
HIS ATTORNEYS INVENTOR
HARUT BARSAMIAN
BY Louis A. Kline
Joseph R. Dwyer
HIS ATTORNEYS INVENTOR
HARUT BARSAMIAN
Louis A Kline
BY Joseph R Dwyer
HIS ATTORNEYS

FIRMWARE SORT PROCESSOR SYSTEM

This application is a Continuation-in-Part of U.S. application Ser. No. 34,397, filed May 4, 1970.

With the latest achievements of the large scale integration (LSI) technology it will be seen that new capabilities in the information processing art will be developed.

With the advent of the inherently advantageous characteristics of LSI, it might be expected that there would be significant cost reductions in information processing due to the automated design and fabrication of large and complex logic circuits in a single package. Further, apparently there will be an increase in the overall system reliability because of the automated manufacturing processes and reduction in the number of needed external interconnections. Then, due to micro-miniaturization and improved technology, higher operational speeds become possible. With LSI, the problems of power dissipation, cooling, packaging, interconnections, production yield and off-the-shelf packages are presenting wider options with LSI than those of the earlier transistors, integrated circuits, and other elements.

By taking advantage of the special capabilities of LSI components, it is now possible to deviate from the present forms of data processing and computer logic organizations to the increased efficiency and benefit of the overall system.

In the history of the computer industry's development, it was seen that the continuously improving cost-performance index of semiconductor and magnetic circuit components stimulated the creation of larger and faster central processing units (CPU) including main memories. This growth factor further stimulated the development of complex and sophisticated software systems and programming techniques. As a result of these developments for computer and electronic data processing installations, the trend is such that the cost for software, applications programming and systems maintenance reaches as high as 70 percent of the total expenditure, and may be expected to go even higher as time goes by. The CPU item in a typical installation begins to approach a factor which involves only a small percentage of the hardware cost.

Thus, with the new form of components and technology available today, some rather basic changes in computer architecture and the ratios of hardware--software resources within the system may be accomplished. The present invention has the objective of minimizing the required software sector of the system by forming certain control procedures and standard routines by means of hardware, such hardware possibly being designated as "firmware" to indicate its function of being hardware which performs a normally performed software routine.

Further objects of the invention involves the incorporation of local logic and self control into the peripheral and terminal units so that they can be driven by a computer without software routines developed for the specific device in question, and to permit the tailoring of efficient systems for particular applications by modularizing the hardware and the software.

SUMMARY OF THE INVENTION

The present invention is designed to achieve the above stated objectives by the decentralization of the processing tasks of the computer or central processing unit. Special purpose hardware/firmware processors are substituted for program routines and/or entire algorithmic functions that have been made with ordered structures and for frequent use in a large spectrum of applications.

The results achieved by such a configuration is to release more central processor space and time for other more complex jobs and supervisory functions; to simplify the software control of the entire system; to ease the requirements for applications programming; and to increase the systems overall throughput.

Thus in the present multiprogramming systems it has been made possible to decrease the heavy information traffic within the system and the frequent switching of the central processing unit from one task to another by the structuring of a special purpose processor designed with LSI components and dedicated to an established routine, such for example, as the routine of sorting.

Thus the present apparatus and system organization developed herein provides for a main memory, a central processor unit, and a "sort processor" interconnected with the two preceding elements which may be thought of as an internally programmed, firmware special purpose processor dedicated to performing the sort routine outside of the computer's central processing unit. The Sort Processor shares the common main memory with the central processing unit, (CPU) on a secondary or lower priority basis and has a simple interface with the central processing unit.

The Sort Processor is organized with its own unique architecture. It comprises a special Search Memory, a Register File and a Micro-Program Storage Unit. The Micro-Program Storage Unit can be subdivided into three specialized control functions, these being Memory control, Search Control, and Peripheral Control.

The Search Memory is divided into three sectors. One sector is called the KEY sector and is designated for storing and searching key words including the logic for comparing key words. The second section is the ADDRESS sector which stores the initial addresses of the records to be handled. The third section stores the tags which specify the status of the keys being searched. The Search Memory may be either an associative memory (AM) or a recirculating memory (RM).

The Register File (RF) is a scratch pad memory device used to store codes representing the initial parameters and boundary conditions which are desired to be handled.

The Micro-Program Storage Unit (MS) is used to store the micro-program of the Sort Processor. This memory may constitute a read-only (ROM) or a read-write (RWM) memory. Since the Read-Write Memory permits greater flexibility and simplicity in the alteration of micro-programs and the debugging and maintenance for very little cost, it is preferred over the Read-Only Memory. Further, the Read-Write Memory in the Sort Processor permits not only various sort algorithms but also complementary functions such as table look up, file maintenance, and list processing by the simple expedient of reloading the newly desired micro-program into the Micro-Program Storage Unit (MS).

Thus three basic micro-routines are placed in the Micro-Program Storage Unit. These are:

a. The search micro-routine which controls the search memory (SM) and which generates the main memory (MM) addresses of the sorted records;

b. The main memory (MM) interface control routine which performs the needed control of communications between the main memory and the sort processor;

c. The peripheral file interface control routine which is used for controlling the input-output (I/O) operations when the Sort Processor (SP) needs to communicate directly with the peripheral files of a peripheral unit.

Each of the above micro-routines is stored in individual LSI memory units and monitored by a common synchronizer which permits simultaneous execution of the search and interface control micro-routines, efficient use of LSI technology, and easy integration of the sort processor with almost any computer system by merely altering the appropriate micro-routines. The combination of a central processor and main memory with a sort processor and peripheral units such as a magnetic file, e.g. disc, tape, CRAM, etc. permits a number of choices in regard to structures for interconnection and intercooperation. In the most preferred embodiment, the central processing unit and the sort processor share a peripheral unit such as a magnetic file and further share the main memory which is divided into two portions, with the sort processor having access to one of the portions only.

Various other aspects of the system and the architectural configurations thereof may be seen by reference to the following drawings and the succeeding description.

DRAWINGS

FIG. 9A shows the general control store configuration of the Micro-Program Storage.

FIG. 9B shows the basic micro-instruction format for the Control Store.

FIG. 10 is a detail diagram of the Search Memory 35.

FIG. 11 shows the search memory word format.

FIG. 12 shows the SM tag registers and associated logic.

FIG. 13 shows the local control store which controls SM operations.

FIG. 15 shows the coding and micro-instruction format for Control Store 51 which controls the Search Memory.

FIG. 16B shows the instruction format for Control Store $CS_2$.

FIG. 17 is a diagram of the Control Store $CS_2$ interrelation to main memory and the buffer to the SP bus.

FIG. 18A shows the data flow through the ALU.

FIG. 18B shows the configuration of the Register File of the sort processor.

FIG. 19 is a diagram illustrating the mask implementation.

FIG. 20 is a diagram showing the configuration of three counters ($k, j', j$).

DESCRIPTION

Figure 1:
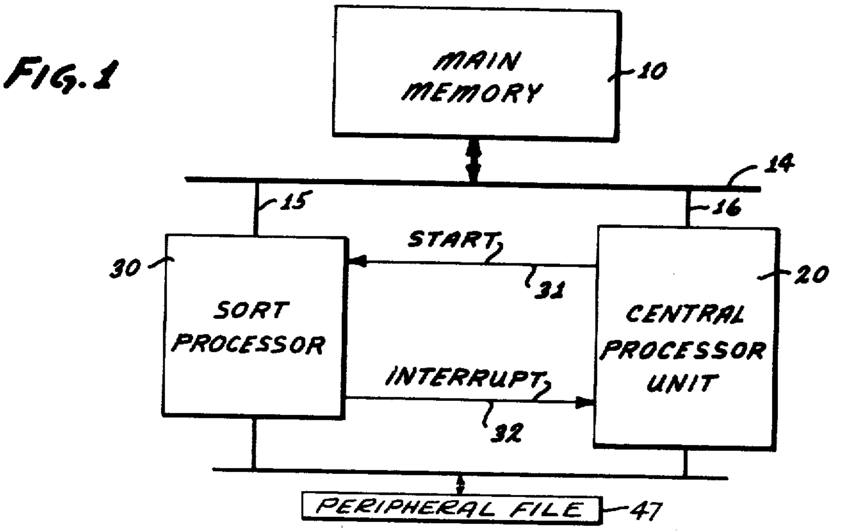
FIG. 1 is a basic block diagram showing the basic elements of Main Memory, Central Processor Unit, and Sort Processor with the interconnecting communication lines for control and exchange of information.

With reference to FIG. 1, the system configuration of the invention is shown in basic block form. A main memory 10 having a main memory bus 14 communicates with a Central Processor Unit 20 through communication lines 16 and to a Sort Processor 30 through communication lines 15. The Central Processor Unit 20 is connected to the Sort Processor 30 via a control line 31 and the Sort Processor 30 is connected to the Central Processor Unit 20 through a communication line 32.

Figure 2A:
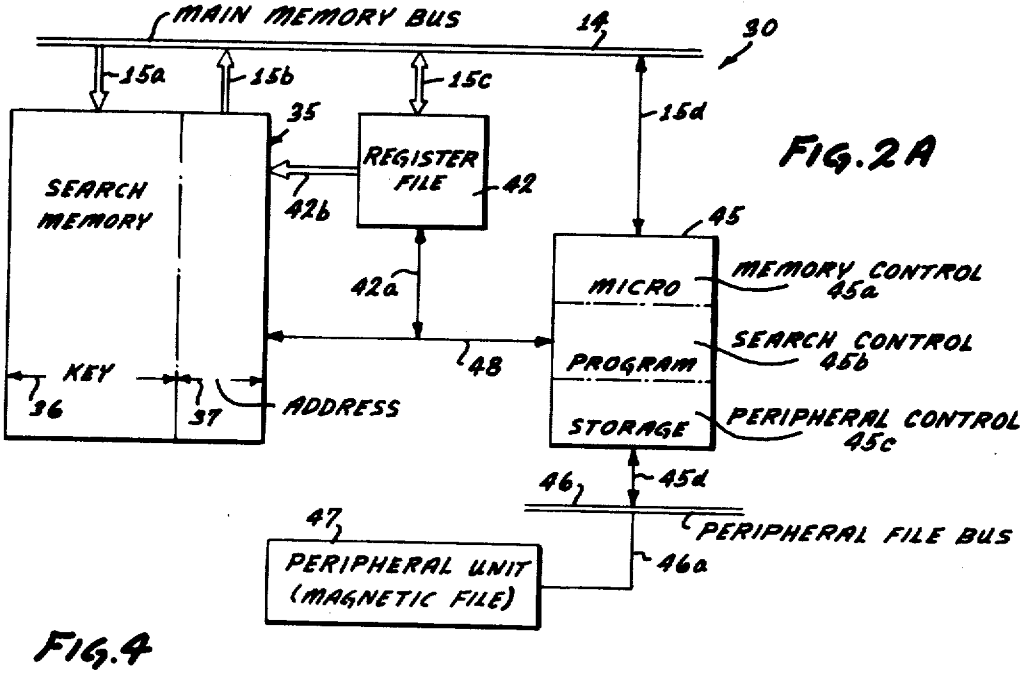
FIG. 2A is a block diagram showing the elements of the Sort Processor and identifying the Search Memory, the Register File and Micro-Program Storage Unit together with inter-connecting lines of communication.

The Sort Processor 30, shown in FIG. 2A, is made of three major functional blocks designed with MOS LSI components. These blocks consist of the Search Memory 35, the Register File 42, and the Micro-Program Storage Unit 45.

Figure 2B:
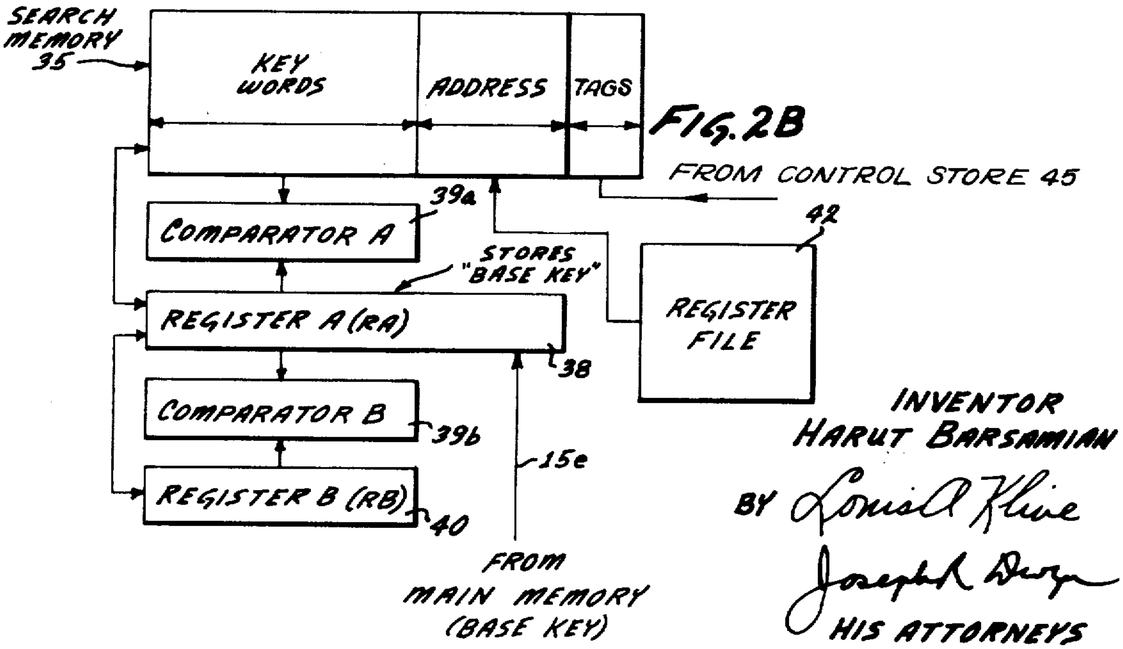
FIG. 2B is a drawing of the Search Memory which includes two registers and a comparator cooperating with the Search Memory element of the Sort Processor.

As seen in FIG. 2A, lines connect the main memory bus 14 to the above mentioned elements by way of communication lines 15*a*, 15*b*, 15*c*, 15*d*, and 15*e* (FIG. 2B). The Micro-Program Storage Unit 45 has communication lines 48 to the Search Memory 35, and the Register File 42 has communication lines 42a to the communication line 48.

The Micro-program Storage Unit 45 has connecting lines 45*d* to a peripheral file bus 46, which is connected through lines 46*a* to a Peripheral Unit 47 which may be designated as a "Magnetic File". The Micro-Program Storage Unit 45 is seen in FIG. 2A to have three functional control sections shown as Memory Control 45a, Search Control 45b, and Peripheral Control 45*c*.

The Search Memory 35 of FIG. 2A is divided into two sectors designated as Sector 36 for storage and search of Key Words, and a second Sector 37 for storing the initial addresses of the records which contain the Key Words.

The number of bits per word in sector 37 of addresses is required to be $\log_2 M$ with M being the size of the computer's main memory in words directly accessible to the Sort Processor 30. However, both sectors 36 and 37 are independently expandable in their bit directions and the entire Search Memory 35 is expandable in the word direction by the addition of modules. With these capabilities, the Sort Processor 30 is permitted to meet various sorting or other functional applications and to be integrated into computer systems that have different magnetic memory sizes.

There are at least two possible types of memory for the Search Memory which may be used, each of these preferably being MOS LSI type memories.

The preferred form of memory for Search Memory 35 is the Recirculating Memory (RM). This Recirculating Memory is organized with recirculating MOS dynamic shift registers.

The second type of memory is the Associative Memory (AM). This is a modular AM with LSI components which is organized using monolithic or hybrid technology. The logic and function circuitry involved is integrated into the Associative Memory chips.

With reference to 2B, the Search Memory 35 is shown interconnected to a Register 38, a Register 40 and Comparators 39*a* and 39*b* which are interconnected between the two Registers 38 and 40, said Registers being further designated as Registers A and B, and said comparators further designated A and B. In FIG. 2B, a communication line 15*e* is shown as a connecting link from the main memory 10 to the Register 38.

Registers 38 and 40 are used to temporarily store Key Word data so that the Comparators 39*a* and 39*b* may make a decision as to their quantitative or numerical relationship (that is to say, whether the data in Register A is or is not greater than the data in Register B.) The subsequent operational description described later herein will indicate how Registers 38 and 40 cooperate with Comparators 39*a* and 39*b*, Search Memory 35 and main memory 10 in order to process Key Word data to serve a desired functional purpose.

Again referring to FIG. 2A, the Register File 42 is a scratch pad memory which is used to store data involving initial parameters and data involving desired boundary conditions. It includes several temporary storage registers for indexing and counting. To provide for uniformity and functional flexibility, all registers in the Register File 42 are made to have the same bit length of $\log_2 M$, where M is the size of the computer's main memory in words directly accessible to the Sort Processor 30.

The Micro-Program Storage Unit 45 is a random access type memory which is used to store the micro-program of the Sort Processor 30. This particular memory may be either a read-only memory or a read-write memory. Preferably, and using LSI, the desired type of memory is the read-write memory (RWM) due to its greater flexibility and simplicity in fast Micro-Program alterations, and for debugging and maintenance (called dynamic microprogramming). The Micro-Program Storage Unit 45 is made to hold three basic micro-routines:

a. the search micro-routine which controls the Search Memory and generates the main memory addresses of the sorted records;
b. the main memory interface control routine which performs all the communications between the main memory 10 and the Sort Processor 30;
c. the peripheral file interface control routine for controlling the input-output (I/O) operations if the Sort Processor needs to communicate directly with the peripheral file unit, such as unit 47 in FIG. 2A.

Each of the above micro-routines is stored in individual LSI memory units and may be monitored by a common synchronizer, which may permit simultaneous execution of the search and interface control micro-routines, efficient use of LSI technology, and easy integration of the Sort Processor with almost any computer system by merely altering the appropriate micro-routines. Further, this partitioning of the micro-routines in individual LSI memory units provides for easy maintenance and diagnostics while keeping the economical factors in line since, unlike magnetic memories, the size of the LSI Semiconductor Memory does not affect the price per bit. The Read-Only Memory or Read-Write Memory of the Micro-Storage may, for example, consist of 4096 bits organized in a matrix of $128 \times 32$.

Figure 3:
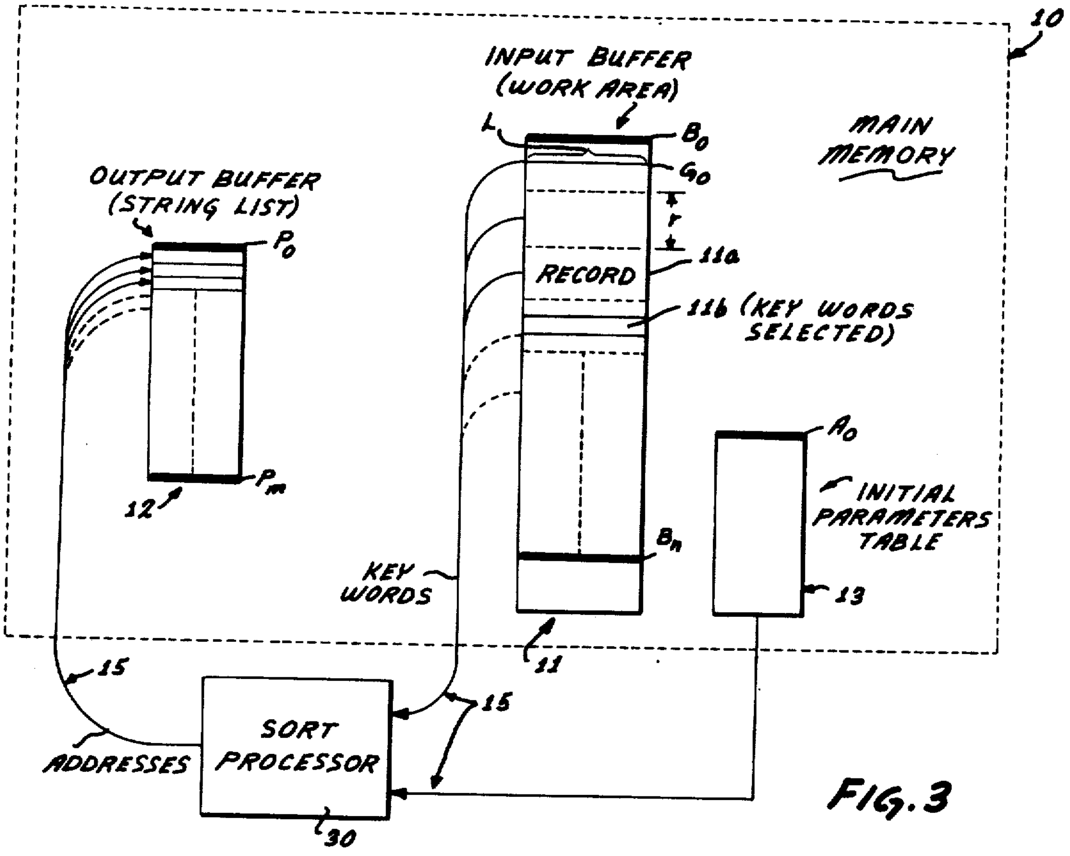
FIG. 3 is a diagram showing the cooperation of the Sort Processor with the Main Memory having portions allocated for an Input Buffer, Output Buffer and the Initial Parameters Table.

Reference to FIG. 3 will show the Sort Processor 30 connected for intercooperation with the main memory 10 and wherein the main memory has certain portions allocated for specific functions. A work area 11 of the main memory is used to operate as an input buffer for storage of raw data to be processed. The word area is split up into portions such as record 11a which consists of a series of data words. Desired portions of data words in a record may be selected for handling purposes and one such is shown as block 11b to represent "Key Words" which have been selected from a record such as 11a for some specific purpose in processing.

As shown in FIG. 3, the word area 11 is divided into locations which have reference addresses therefor. Thus each location is referenced by the initial address of the first record, the initial address of the second record, the initial address of the third record, and so on, up to the initial address of the last record. The initial address of the first record is designated as $B_0$ and the initial address of the last or final record of the work area 11 is designated as $B_n$.

In regard to the Work Area 11, the letter designated L represents the length of the key word in number of characters. The small letter designated *r* represents the length of a record in number of characters, this being normally 80 characters, as from a single punched card.

Now since the selected Key Work in any given record will have a different address from the initial address of that particular record, the address of the Key Word of the first record is designated as $G_0$; and the symbol $G_n$ would designate the address of the Key Word of the last record in the work area.

Another allocated portion of the main memory 10 is a form of output buffer area which is called "String List" 12. Data which has been processed by Sort Processor 30 is conveyed over lines 15 to the String List 12 for storage of the addresses which have been processed into a desired functional configuration. The string list 12 has a series of locations which are given position addresses from top to bottom, for example, and $P_0$ represents the first or initial address of the string list while $P_m$ represents the final address of the string list.

Again referring to FIG. 3, another allocated portion of main memory 10 is the Initial Parameters Table 13 which is used to store control data defining the parameters involved in a given data processing operation. The Initial Parameters Table (IPT) 13 will be seen to have a series of locations of which the initial or first address is designated as $A_0$ and a final or last address of $A_n$.

As seen by the communication lines 15 of FIG. 3, parameter data from the main memory 10 may flow into Sort Processor 30; Key Words flow from the work area 11 to Sort Processor 30; and processed data (from Sort Processor 30 in the form of address data) flow into storage in the string list 12 of main memory 10.

Again referring to FIG. 1, the Sort Processor 30 is connected to the main memory channel of the computer and does not require any specific or extra hardware provisions from the computer since it behaves as any peripheral controller. In the situation of a multiprocessing environment, the Sort Processor 30 shares the common Main Memory with other processing units on a preestablished priority basis, but normally the interface between the Sort Processor 30 and the Main Memory 10 is asynchronous and operates on a request acknowledgement basis.

Figure 4:
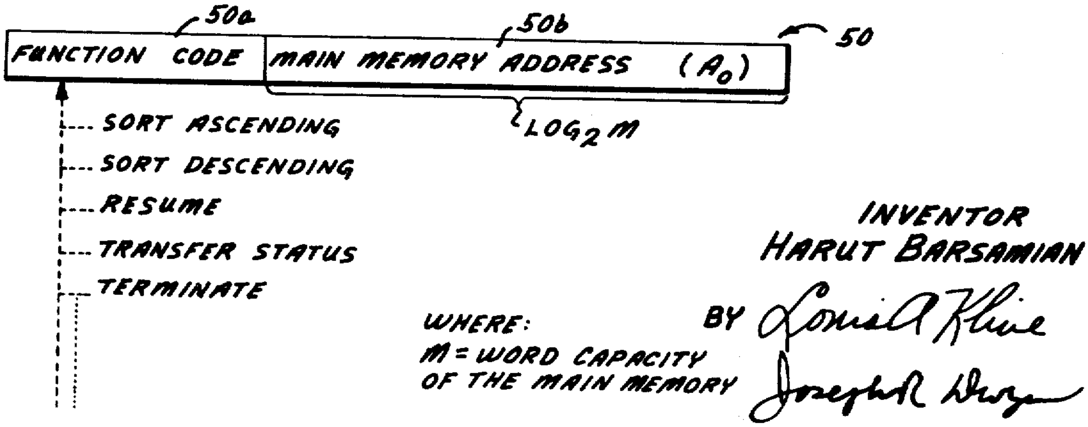
FIG. 4 shows a word field for the control word format indicating portions for the function code and for the Main Memory Address for a given record.

Only simple software support is required for the Sort Processor 30. Reference to FIG. 4 shows a simple control word format 50 which is divided into a function code **50*a* and a main memory address 50*b*. Various function codes may be inserted into the area 50*a*** to perform the various functions listed in FIG. 4.

Figure 5:
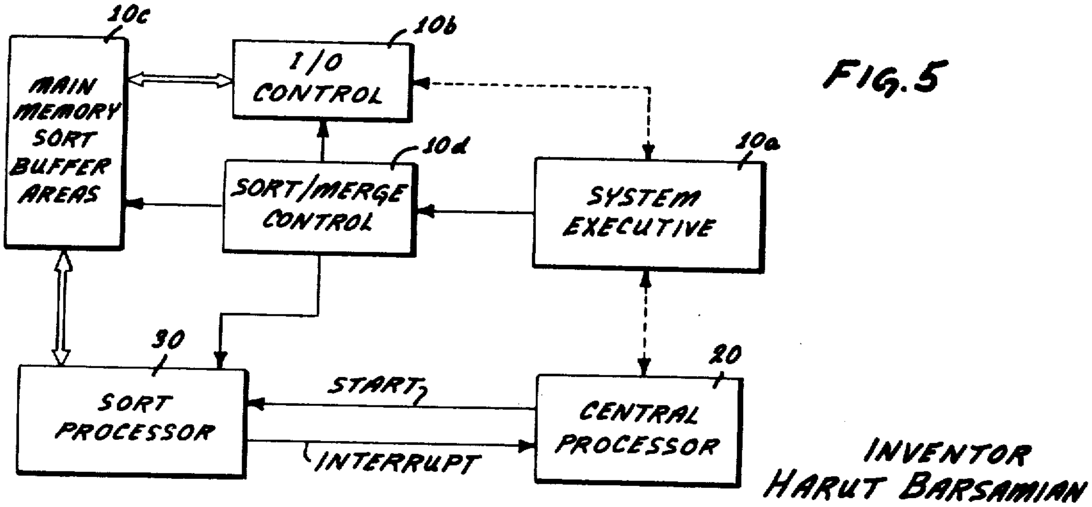
FIG. 5 shows a block diagram of an overall system in combination with the Sort Processor and including the System Executive Routine Unit, the Input Output Control, the Sort/Merge Control and the Main Memory including the Buffer Area of the Main Memory used for sorting.

A typical system organization which may be used is shown in FIG. 5 wherein a Central Processor Unit 20 cooperates with a System Executive Control **10*a* and a Sort Processor 30 in order to perform, for example, a sort/merge operation. A Sort/Merge control 10*d* works with input-output control 10*b* together with the buffer areas of the main memory 10*c* and the Sort Processor 30 to provide an overall functional system which will release the Central Processor 20** of much of its routine processing time and make it more efficiently available for other less routine tasks.

Figure 6A:
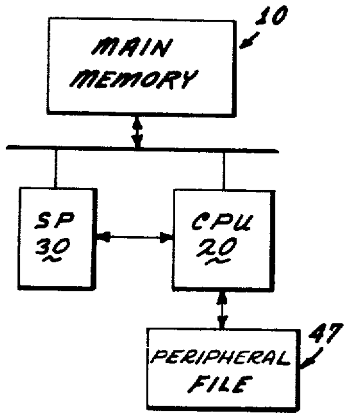
FIG. 6 shows a series of various advantageous configurations of the invention designated as FIGS. 6A, 6B, 6C, and 6D.

The Sort Processor 30 can be integrated with a computer system in a number of configurations. Typical system configurations are shown in FIGS. 6A, 6B, 6C, 6D. The system of FIG. 6A is the simplest configuration where the Sort Processor 30 shares the Main Memory 10 with the Central Processor Unit 20 on a lower priority basis. The sorting time for this configuration is relatively long.

Figure 6B:
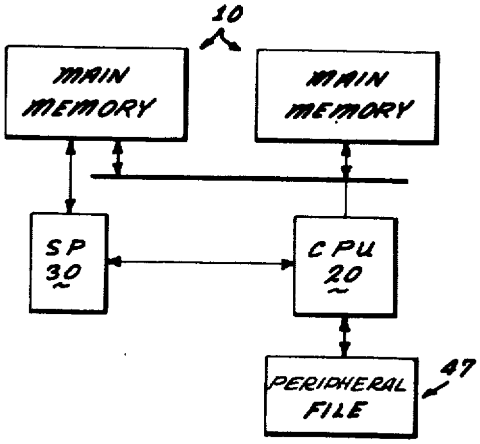

The system of FIG. 6B allows the Sort Processor 30 more freedom in accessing the appropriate main memory bank 10. Here, although the Sort Processor remains a low priority processor, this configuration results in a relatively higher speed.

In both system configurations of FIG. 6A and 6B, the data transfer between the Memory 10 and the peripheral or magnetic file 47 is accomplished through a conventional input-output channel and controlled by the appropriate software routine.

Figure 6C:
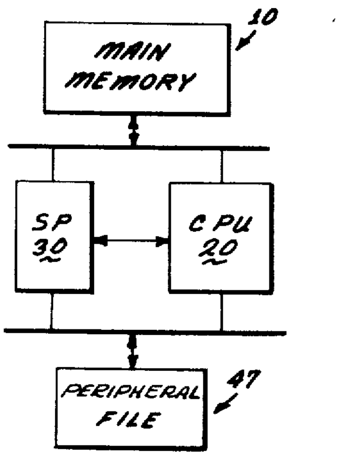

The system configuration of FIG. 6C has the same main memory sharing scheme as that of 6A, but in addition, Sort Processor 30 shares the peripheral file with the Central Processor Unit 20. The control of the data exchange between the main memory and the peripheral file, which is required in the sort/merge operation, is performed by the micro-routine of the Sort Processor 30.

Figure 6D:
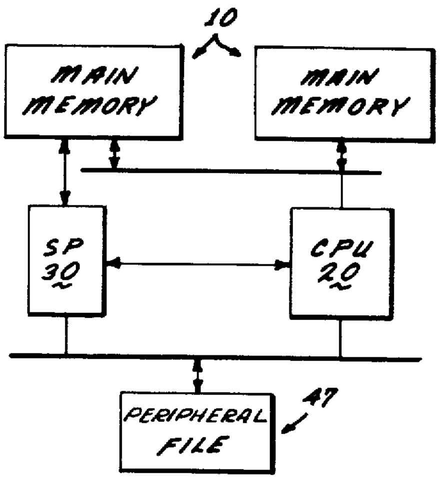

The system configuration of FIG. 6D combines the main memory sharing of FIG. 6B and the peripheral file sharing of FIG. 6C. The system of FIG. 6D comprises full parallel processing capabilities and offers the highest sorting efficiency.

In these above configurations, the logic structure and basic functional blocks of the Sort Processor 30 remain essentially unchanged. The specific interface characteristics of the systems of FIGS. 6B, 6C, 6D are readily programmed into the Micro-Program Storage of the Sort Processor 30. The choice of a configuration depends on the spectrum of applications required of given computer systems.

Figure 7:
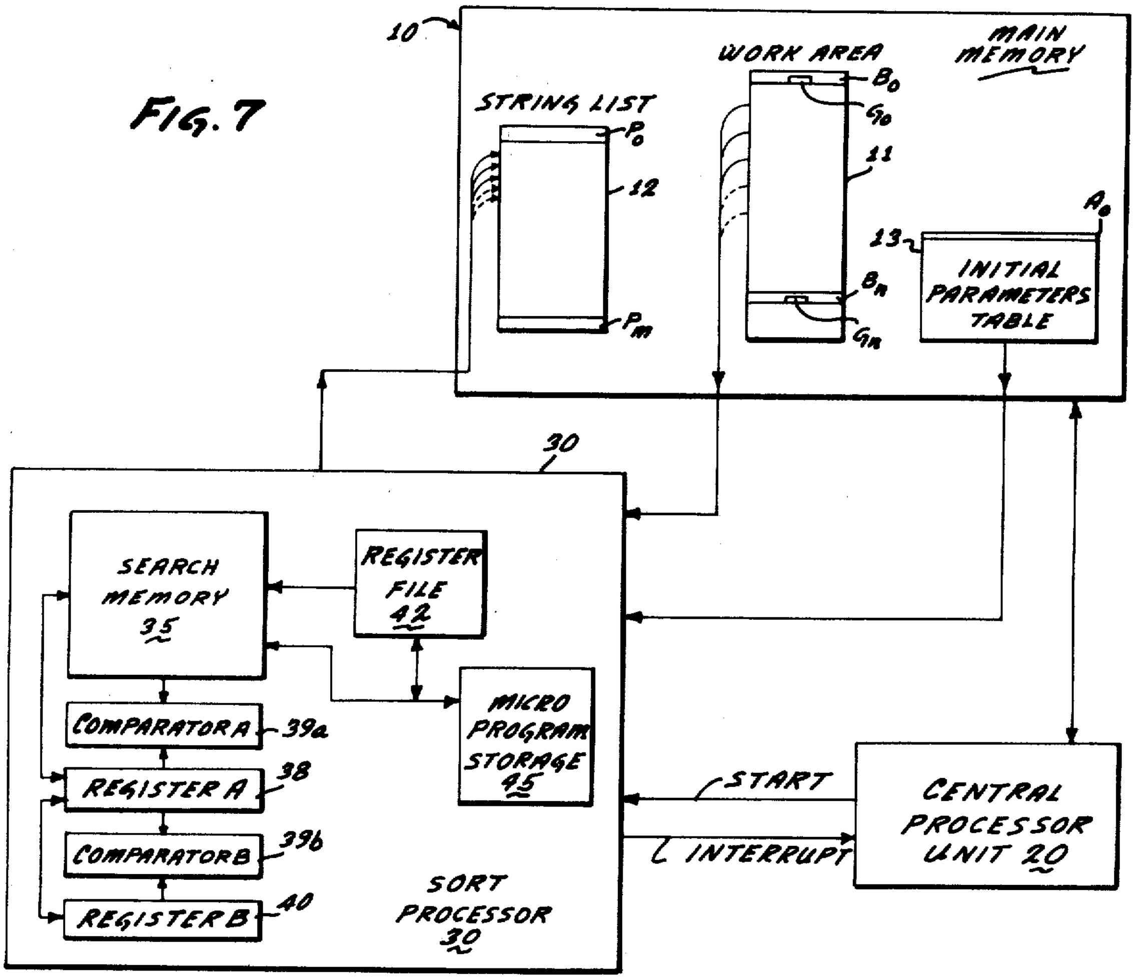
FIG. 7 is an overall system drawing delineating the important elements involved.

An overall system diagram showing more details than that FIG. 5 with respect to the system of the present invention is shown in FIG. 7. The important elements of the main memory are shown as the Work Area 11, the String List 12 and the Initial Parameters Table 13. The main elements of the Sort Processor 30 are shown as the Search Memory 35 and its Registers interconnected Comparators, the Register File 42 and the Micro-Program Storage Unit 45.

Since a significant portion of the workload of a business oriented system is sorting, the Sort Processor (SP) is established to improve the cost-performance ratio of the host computer system, particularly for business oriented systems. By integrating a special purpose peripheral processor into a system, the throughput for the system is increased as a result of increased MM (Main Memory) availability and additional CPU time which can now be applied to other programs. This system presents the SP hardware and firmware basic design, as well as a cost performance evaluation of the overall system. Since sorting is done autonomously by the firmware, the SP software sort routine previously occupying main memory (MM) is no longer required by the system. From a user program aspect the time-space product is enhanced. Since many systems are MM bound, and MM constitutes the bulk of the central processing unit (CPU) cost, this point should be stressed. CPU time previously consumed in sorting is now available for execution of other programs. Some quantitative results of computer systems throughput improvement with the SP have been computed using a mathematical model.

Sorting consists of arranging a group of random records into ascending or descending order, based on a key word which may be any subset of the record. The CPU initiates the sort operation by issuing a sort command to the SP, after an initial parameter table has been prepared in MM. Record addresses and other pertinent parameters are specified in the initial parameter table. The SP instruction repetoire consists of sort ascending, sort descending resume, terminate, read status, and merge. The CPU is interrupted at the completion of sorting, and is informed of the SP status.

Simplified system software is a direct result of removing the sort routine from the systems library and replacing it with the firmware processor. System support for the SP is reduced to preparing the Initial Parameter Table and issuing an SP command. Transferring records between MM and the peripheral file is performed by the host computer system in system configurations FIG. 6A and 6B, and can be performed by the SP or the host computer systems in configurations of FIG. 6C and 6D.

Standard LSI components comprise the bulk of the SP hardware. Control memory (read-write or read-only type), register file (read-write memory), and search memory (MOS dynamic shift registers) are the major components. Gating, timing and interfacing circuitry can also be implemented with standard MSI or LSI components. Presently off-the-shelf LSI products are available which perform these functions. LSI implementation of the SP is possible with no specialized chip design.

Economy, minimal system support, system independence, and sorting speed are the primary design considerations. Maximum cost is dictated by the desirable performance improvement. System independence allows the SP to be attached to any existing system. Economy is the primary consideration since the speed requirement is easily met.

SYSTEM ARCHITECTURE

The SP 30 shares the MM 10 with the CPU 20 on a low priority basis. FIG. 1 is a general block diagram of the SP integrated into a host computer system. Random records stored in a peripheral file 47 are transferred to MM 10. Subsequently, under firmware control, the key words are transferred to the SP 30 and sorted. As a result a list of starting addresses of records ($B_i$) is compiled in an ascending or descending order in MM 10.

SORT PROCESSOR ARCHITECTURE

Figure 8:
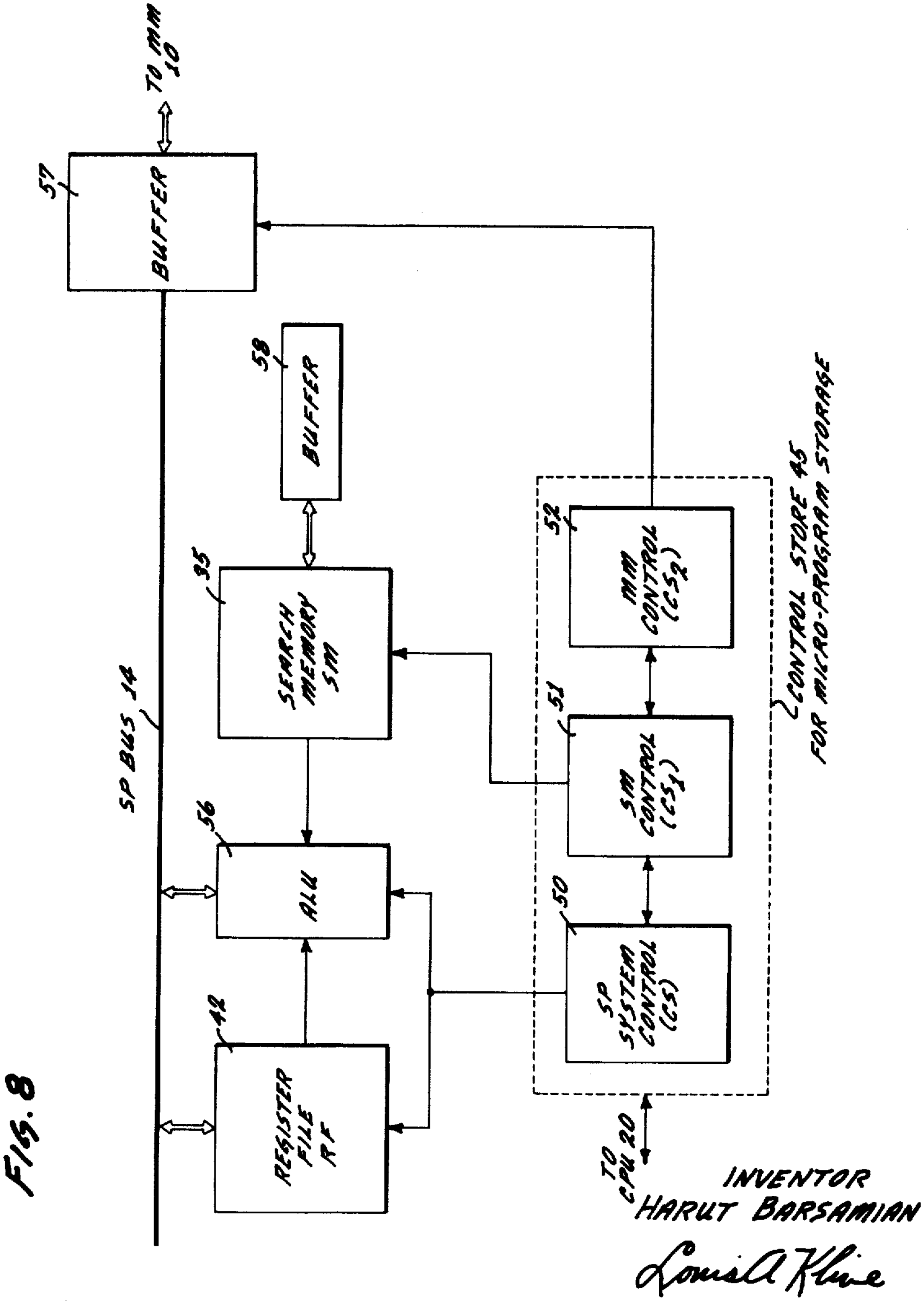
FIG. 8 is a block diagram showing more detail than FIG. 2A of how the Sort Processor is integrated into a computer system and shows the Control Store of the Micro-Program Storage 45.

The SP is a bus organized system. A single MSI component provides OR wire capability for bus implementation, a storage register, input and output gating, and a timing gate input. Presently a National Semiconductor product DM 8551 or equivalent, is suitable for this purpose. FIG. 8 is a block diagram of the SP illustrating the major blocks; search memory 35 (SM), control store 45, arithmetic logic units 56 (ALU), and register file 42 (RF). SM 35 is of singular importance in the SP operation. The ALU 56 provides associative logic functions for the SM 35 and the arithmetic functions for the system. Communications with MM 10 are achieved via local buffer registers 57 under control of the control store ($CS_2$), 52. Similarly SM 35 communicates with the system through local buffer registers 58 under local control $CS_1$, 51. CS 50 contains the microprogram of the sort algorithm. Coordination of all processing is done by CS 50 via four distinct type of commands: (1) SM; (2) MM; (3) arithmetic; and (4) information transfer. Buffering and decentralized control achieve two basic advantages. First, functional capability for a given control store capacity is maximized. Second, simultaneous processing within the SP is achievable. A simple priority logic resolves the possible data path conflicts, e.g., requests for service from an occupied component causes that request to "wait" until acknowledgement is received.

CONDENSED SORT ALGORITHM

With reference to FIG. 7, it is seen that five basic steps constitute the sort algorithm:

1. Key words from the MM work area 11 are transferred to SM 35 (until SM is fully loaded). The MM starting address of each record ($B_i$) is simultaneously computed by the SP 30 and included with the associated key word, constituting one SM word.
2. SM 35 locates the next desired key (largest or smallest).
3. $B_i$ (of the record selected in step 2) is transferred to the first vacant location in the MM string list 12.
4. An additional key word is fetched from the MM work area 11, (replacing the SM word vacated by step 2). The key word is "verified" (compared to the key word last sorted) to determine whether it is to be included in the current string and is stored in SM. If it is excluded from the current string, the SM word is tagged ($SR_i$), indicating that it is to be included in a subsequent string.
5. Return to step 2. Sorting continues until one of three conditions occur. These are:
   a. All records in the work area 11 have been exhausted.
   b. MM allocated to the string list 12 is filled.
   c. SM 35 contains only tagged words, $SR_i$, not valid for the current string.

SP procedure, in the event of the preceding results, is respectively:

a. The remaining keys in the SM 35 are sorted, the CPU is interrupted and informed of status. The CPU 20 may load new sets of unsorted records into the work area 11, update the Initial Parameters Table 13, and issue a "Resume" command to the SP.
b. The SP is halted, the CPU 20 is interrupted and informed of status. The CPU now transfers the sorted string of records to the peripheral file, may update the Initial Parameters Table 13 and resume the SP operations.
c. The CPU 20 is interrupted and informed of status. A "Resume" command to the SP 30 removes the tags, $SR_i$, and the SP proceeds to sort the next string.

At completion of sorting, the string list consists of a list of record starting addresses ($B_1$) in chronological order.

Upon completion of sorting, sorted strings remain in the peripheral file 47 of FIG. 1. Merging the strings is accomplished using the same replacement sort algorithm, adding features for selecting the strings from which each succeeding key is fetched. The CPU 20 supplied a parameter ($k$) to the SP 30 specifying the number of strings to be merged ($k$ = No. of strings $-1$). One string indicates a sort operation, in which case keys are fetched from consecutive records in the work area 11. The string selection algorithm, for the multiple string merge ($k>1$) consists of two steps:

1. Keys are fetched alternately from each string for the initial SM loading.
2. As each key is sorted, the replacement is fetched from the same string where the last sorted key originally belonged.

Using this algorithm, a minimum number of passes are required for merging, namely, $\log_{k+1}e$, where $e$ = total number of strings and $k+1$ = No. of strings merged in each pass.

ALLOCATION OF MAIN MEMORY

The definitions of the symbols defining each area in MM 10 of FIG. 3 are as follows:

a. Work Area:
  - $B_o$ = starting address of the first record
  - $B_n$ = starting address of the last record
  - $B_i$ = starting address of the record No. $i$
  - $G_o$ = starting address of the key word in the first record
  - L = key length
  - $r''$ = displacement of the starting address of the record to the starting address of the key (i.e., $G_i = B_i + r''$)
  - $r$ = record length b. String List:
  - $P_o$ = the initial address of the string list (i.e., location where $B_i$ of the first sorted record is stored)
  - $P_m$ = the last address of the string list c. Initial Parameter Table:
  - $A_o$ = starting address of the initial parameter table The contents of the RF 42 of FIG. 7 are enumerated in Table 3. Arrows indicate the portion of the RF 42 contents transferred directly from the Initial Parameter Table, 13.

TABLE 3

Register file contents in chronological order of the RF address:

| Register Address | Register Contents |
|---|---|
| 0 | Number of entries in the initial parameter table |
| 1 | 1 |
| 2 | 0 |
| 3 | $P_o$ |
| 4 | $P_m$ |
| 5 | $r$ |
| 6 | $r''$ |
| 7 | $j_{max}$; mask; sort order |
| 8 | $k_{max}$ |
| 9 | $B_{01}$ |
| 10 | $B_{02}$ |
| 11 | $B_{03}$ |
| 12 | $B_{ok}$ |
| 13 | $B_{n1}$ |
| 14 | $B_{n2}$ |
| 15 | $B_{n3}$ |
| 16 | $B_{nk}$ |
| 17 | |
| 18 | |
| " | |
| " | |
| 25 | $B_{i-1}$ |
| 26 | $K^o_{i-1}$ |
| 27 | " |
| 28 | " |
| 29 | $K^j_{i-1}$ |
| 30 | $G_o$ |
| 31 | $r' = r + r''$ |

Registers 1 and 2 store constants required for the SP arithmetic operations. In Register 7, $j_{max}$ is the ratio of the key word length and machine word length in bytes and is used for the search operations in SM. Mask indicates the bytes positions to be masked during the search operation. Sort order indicates ascending or descending sort is to be performed. The symbol $k_{max}$ in the Register 8 specifies the number of strings to be merged simultaneously. Registers 9 through 24 are assigned to store initial ($B_o$) and final ($B_n$) address of strings in the MM work area during the merge phase. Registers 25 through 29 are used by the SP as temporary storage to store the record address ($B_{i-1}$) and subsets of key words ($K^j_{i-1}$) when multiple response is detected during the search operations. The contents of Registers 3, 4, 5, 6, 30 and 31 are as specified earlier.

HARDWARE vs. FIRMWARE vs. SPEED

Two particularly time consuming operations in the Sort Processor (SP) are SM 35 accessing and the low priority accessing of MM 10. As a result, the time consumed in transferring a key from MM to SM is comparable to the time consumed in selecting the largest (or smallest) key. Based on this, it has been concluded that the optimum SP word length should be equal to the word length of the MM.

Hardware-Firmware-speed tradeoffs are the pertinent considerations in this decision. Since key length is generally greater than the MM word length, hardware is reduced both in SM capacity and in the bus implementation. A penalty is paid in firmware complexity because sorting on subsets of the key is necessary when multiple response is detected. Beginning from the most significant subkey, only a sufficient subset of the key word is transferred to SM, necessary for making relative magnitude decisions. Equalities in equal significance subsets of the keys are resolved by fetching the next significant subkey and repeating the search. Total sorting speed remains approximately equal to that in which a full key is stored in the SM 35. Time saved in transferring keys from MM 10 is approximately offset by the increased sorting complexity. Furthermore, the increased complexity in firmware does not significantly add to System Control Store CS 50 cost, since the CS 50, specified as a 256 × 32 bit basic LSI module, is ample.

CONTROL STORE ORGANIZATION

Each of the three decentralized control stores, FIG. 8, CS 50, $CS_1$ 51, and $CS_2$ 52 have identical organizations. A two dimensional (2D) RAM, storing one micro-instruction per word, FIG. 9A, is the general configuration. The micro-instruction format, FIG. 9B, has three fields: functional implicants, feedback selection, and jump destination address. Hardware control signals are derived by the direct application of the functional implicants. Feedback selection is limited to enabling one of S feedback parameters in each micro-instruction. A negative response from the selected feedback parameter implies the incrementing of the present address by one, i.e., fetching the next micro-instruction in sequence. A positive feedback response causes a jump through an activated Preset Enable signal which sets the Branch field of the current micro-instruction into the address register 59 of the control store. Limiting the number of branches per micro-instruction to one appears to be adequate for this particular design of the SP.

Mutually exclusive feedback parameters allow the Feedback field of the micro-instruction to be decoded with no loss of generality. The length of the Feedback field is equal to $\log_2$ S bits, where S is the total number of feedback signals in the SP. "Ready" and "busy" responses from $CS_1$ and $CS_2$ are applied as feedback signals to CS.

FURTHER DETAIL: SP DESCRIPTION

Search Memory

All associative processes are performed by the SM 35. FIG. 10 is a block diagram of the Search Memory. SM storage is implemented by parallel dynamic shift registers 60, 61, 62 with Buffers 63, 64, 65 forming a pseudo-associative processor in conjunction with ALU 56 and $CS_1$ 51. Operations, such as content search, will stop the SM clock on a particular word. This feature often avoids waiting through an additional SM access time. Micro-programs must maintain the stopped clock time interval within the dynamic shift register specifications. The SM word format is made up of three fields as shown in FIG. 11, namely, the key word field ($K_i$), the MM address ($B_i$) field, and a field of tag bits. Chronological steps in the "search algorithm" are respectively:

1. Write the first key ($K_i$) in SM into a comparison register (B), (39*b* of FIG. 2B).
2. Compare the next key ($K_{i+1}$) to $K_i$. Retain the larger (smaller) in B, (39*b* of FIG. 2B).
3. Continue step 1 and 2 for one complete SM cycle. At the end of the cycle, the greatest (or smallest) key is retained in B (39*b* of FIG. 2B).

Because the search is conducted on a subset of the key, starting with the most significant subset, the preceding algorithm must be interrupted in the event the greatest (smallest) subkey is not unique in the SM. The next most significant subkey must be fetched in order to make a relative magnitude decision. One bit is provided ($R'_=$), 66, to indicate the uniqueness of the selected key. $R'_=$ (66) is reset with each > (or <) response, and set with each equality response, defining $R'_= = 0$ as a unique key.

Subkey replacement micro-routines are initiated by a $R'_= = 1$ test result, included in the search routine. The tag bit field within the SM word format, FIG. 11, serves a book-keeping function for equal subkey replacement. The key replacement micro-routine begins with one SM cycle for tagging (both $SR_=$ and $SR_{128}$ $_j$ tags) all equal subkeys. As each key is replaced, the $SR_=$ tag is removed. Remaining keys with $SR_{128}$ $_j$ tags are necessarily the largest in the SM. Consequently, subsequent searches are limited to that particular set. The tag registers are included in the $CS_1$ 51, feedback logic 67, in conjunction with a *j* counter (monitoring significance), accepting only valid keys to be considered in the search. Equalities encountered in the tagged words necessitate subkey replacement with lower significance subkeys, until a relative magnitude decision is possible. The "*j* index" monitors the significance of the subkey via controlling read-write logic to the tag registers. In the interest of efficiency some specialized logic for tag registers manipulation has been provided. A tag register block diagram and logic functions are shown in FIG. 12.

In FIG. 12, $SR_0$ and $SR_i$ tag bits indicate an occupied SM word and exclusion of that particular SM word from the current string, respectively. A word with $SR_i$ tag is ignored. Counter $C_0$ 68, FIG. 10, monitors that number of occupied SM words. It counts $SR_0$ tag inputs directly, but can be reset from the CS 50. Address counter $C_a$ 69, FIG. 10, slaves directly from the SM clock 70 and can be reset by CS 50. $C_a$ 69 is analogous to an address register. All SM commands to be executed over the entire SM begin with a $C_a$ 69 reset. Commands, which apply only present address to end the cycle, omit the $C_a$ reset. Associative logic for the SM is provided by the ALU 56 which is shared by $CS_1$ 51 and CS 50. Priority takes place as explained hereinbefore.

FIG. 12 shows the control of the tag bits of the SM. Block 63 is the logic with buffer registers which sets or resets the proper tag bits depending on signals from the Control Store $CS_1$ or the j counter. $CS_1$ enables the writing of tags. The tag field 60 is shown for the six bits labelled as $SR_=$; $SR_{j-1}$; $SR_{=2}$;$SR_{=1}$; $SR_T$; $SR_0$.

The output of the tag field is sensed by a multiplexer logic, block 67, and serves as a feedback parameter for the Control Store, $CS_1$.

SM Control

All SM operations are conducted under control of local control store ($CS_1$), 51, FIG. 13. Associative commands are executed over the entire SM. However, SM "resume" commands, only apply from present address to the end of the cycle. Load and similar commands remain activated from present address until a vacant word is reached. Sequencing of micro-instructions is controlled by selecting the proper feedback parameter (as mentioned in the general CS description). For example, in executing a load instruction, the $CS_1$ clock is inhibited until a vacant SM word is reached. In order to locate a vacant SM word, the occupied tag ($SR_0$) feedback parameter is enabled. A positive feedback response ($SR_0$) causes the information contained in the buffers 63, 64, 65 (FIG. 10) to be written in SM. COmpletion of the write operation is succeeded by advancing CS 50, (FIG. 8) to the next micro-instruction providing a "ready" response to CS 50. A ready or "-negative" response again inhibits the $CS_1$ clock. $CS_1$ 51, remains in this "no operation" state until the next instruction is received from CS 50. FIG. 13 shows the Control Store $CS_1$ 51 of FIG. 8 where the $CS_1$ 51 contains micro-instructions whose format is consistent to the basic micro-instruction format of FIG. 9B. In FIG. 13, the functional implicants field directly controls the hardware associated with the SM functions.

The feedback parameters selection field is compared with the feedback parameters received from ALU 56 and other sources (as SM logic and as tags) to decide the sequencing. This is done by test logic 71; if the indication is "positive" then the next micro-instruction is fetched from the location specified in the Branch Destination Address field, which is fed to address register 59'. Otherwise, the next micro-instruction in sequence is fetched by "incrementing-by-one" the address register 59'.

Figures 14, 16A:
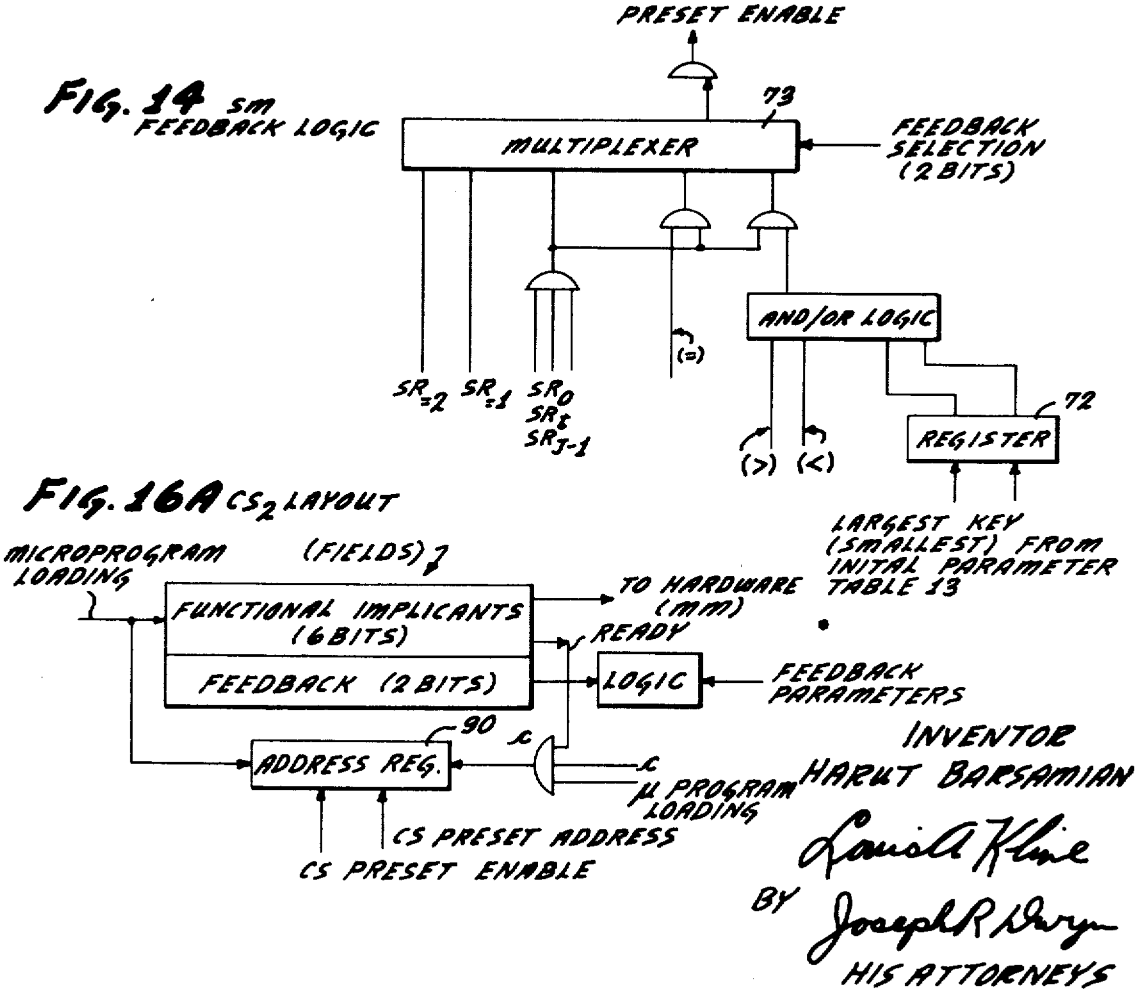
FIG. 14 is a functional diagram of the "test logic" for testing feedback parameters.
FIG. 16A is a diagram of the second Control Store, $CS_2$, which provides control of main memory.
Figures 21A, 21B, 21C, 21D:
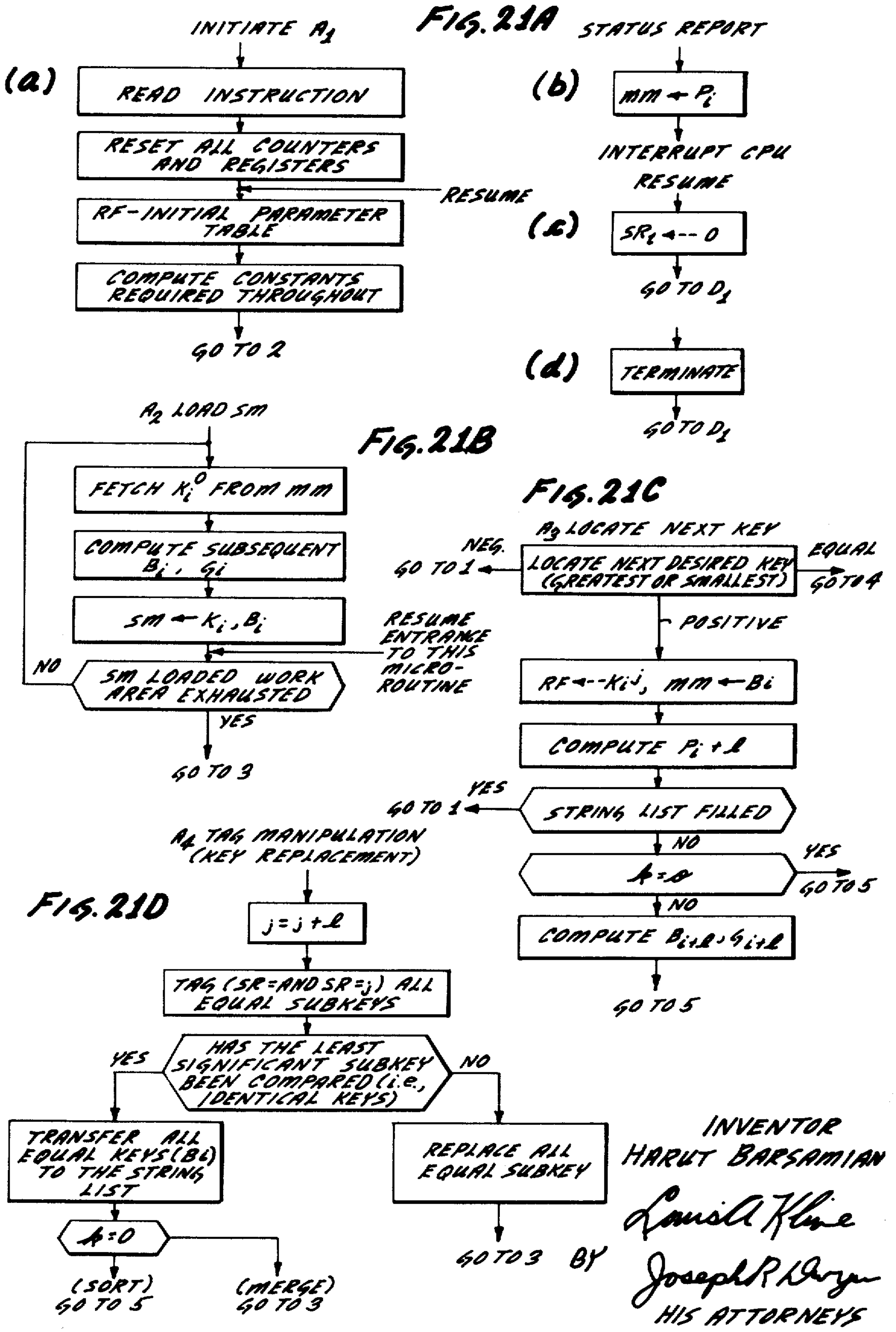
FIGS. 21A through 21E are flow charts of the micro-routines for the sort algorithm.
Figure 21E:
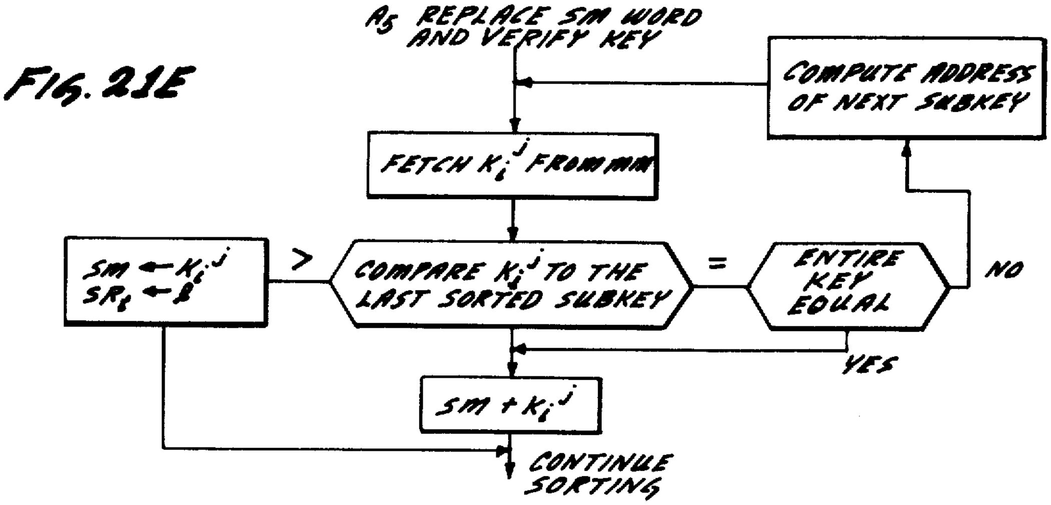

A functional diagram of the test logic 71 supplied for testing one of five feedback parameters is given in FIG. 14. $CS_1$ 51 is consistent with general control store description, with one exception. The "type" of inequality (greater or less than the feedback parameter) is specified in a buffer register 72 (transferred from the Initial Parameter Table 13). Normally feedback is completely specified in the micro-instruction. Sort ascending and sort descending is established by specifying the greater and lesser inequality, respectively, by the preceding dynamic micro-program alteration.

In FIG. 14 there is shown the feedback parameters: $SR_o$; $SR_i$; $SR_{=1}$; $SR_{=2}$; $SR_{j=1}$; also the equality, greater, and lesser parameters: =, >, <, which signal the multiplexer 73.

The feedback and the other parameters including the "largest key" from Register 72 are fed to multiplexer 73 which puts out the "preset enable" signal. The output signal "preset enable" corresponds to that in FIG. 13.

$CS_1$ 51 coding and the micro-instruction format is shown in FIG. 15. $CS_1$ is provided with an instruction repetoire of four instructions for sorting:

1. Find the largest (smallest) key
2. COntent search
3. Load
4. Unconditional SM cycle.

CS 50 specifies the address of the first micro-instruction of one of these four micro-routines in issuing commands to SM 35. In addition, tag register manipulation is controlled from CS 50, since CS 50 contains the sort algorithm. Overlapping of the search and sort function occurs in this area.

Main Memory Control Store

Referring to FIG. 16A, which is a block diagram of the Control Store $CS_2$ 52, communication between MM 10 and the SP 30 is established via a buffer address register 90 plus a bi-directional data buffer 57 (FIG. 8). MM control and all buffer gating is controlled from the local Control Store $CS_2$ 52. The $CS_2$ instruction format, FIG. 16B, can be considered as two fields: functional implicant (MM control and gating signal) field as well as a feedback selection field. FIG. 16B, also lists the micro-instructions in each of the two micro-routines: read MM and write MM. It should be noted that there is an absence of a branch destination field in the $CS_2$ format. Data paths involved in MM-SP communication is shown in FIG. 17.

FIG. 17 shows MM 10 communication lines with buffer 57 and Control Store $CS_2$ 52. Buffer 57 connects to the SP/bus 14. $R_D$ represents the Data Register while $R_A$ represents the Address Register of Buffer 57.

ALU Functions

Data flow through the ALU 56 is shown in FIG. 18A. One operand is held in comparator B (39b of FIG. 2B and FIG. 18A) the other is supplied directly from the bus 14 to Register Accumulator 73. The CS instruction is provided in a five bit field (32 functions) for compatibility with MSI-ALU products. However, for sorting, the ALU utilization is limited to one arithmetic function (addition) plus three logic functions (>, <, =).

Register File

FIG. 18B shows a detail block diagram of the Register File. General data storage registers are provided in the form of a two dimensional RAM, shown in FIG. 18B. The RF 42 is directly addressable by Control Store CS 50 via $RF_A$ 74 and indirectly addressable (IA) from the bus 14 via $RF'_A$75. Bus access to the RF address register, $RF_A$ 74, is useful for indexing.

Masking

In situations when the key length is not an integral multiple of the word length, masking of the incomplete subkey is necessary. Masking is implemented by disabling one byte increments of the ALU 56 during search, as seen in FIG. 19. The number of SP words per key ($j_{max}$) from $j$ counter as well as the number of bytes to be disabled are transferred to local registers 130 from the register file, RF 42 which information originated in the Initial Parameter Table 13. Masking occurs only when the subkey search index, $j$, is equal to $j_{max}$.

The contents of the $j$ counter is compared (at Comparator 76) with the $j_{max}$ stored in Register 77. If search index $j$ is equal to $j_{max}$, the Comparator 76 enables Register 130 to accomplish the masking for the ALU.

Counters

Referring to FIG. 20, three parameters must be continuously monitored throughout the sort operation. The $j$ counter 131 is assigned to monitor the significance of the key subset currently considered in the search; the $j^1$ counter 147 is assigned to monitor the significance of the key subset involved in "verification" following key replacement. The two preceding parameters ($j$ and $j^1$) are independent. Alteration of strings during the initial SM loading (merge) is monitored by the k counter 146. The symbol $k$ is a modulo $k$ counter where k equals the number of strings minus 1. The counters are multiplexed onto the bus 14 in addition to providing input to special devices (i.e. tag registers). Functional control for the counters is generated directly in the CS instruction format.

SP System Control Store

Inspection of the SP architecture reveals the existence of four mutually exclusive sets of commands, four sets of commands which cannot be executed concurrently due to hardware limitations. Mutually exclusive instruction sets can be stored sequentially in Control Storage. Reduced instruction length (suitable for LSI implementation) and more efficient use of Control Storage, are two advantages of this design. The mutually exclusive limitation has not been imposed by functional inadequacy of CS 50 but by hardware limitations. Two bits in the instruction format are devoted to selecting one of the four mutually exclusive instructions: (1) ALU; (2) SM; (3) MM$j$; (4) IT. A complete specification of each of the four mutually exclusive instruction formats in given in Table 23.

The micro-commands, listed in the last column, are the actual hardware operations. The second column selects one feedback parameter to be tested. Table 23 also lists the feedback parameters. A positive response from the test cause a jump to the micro-instruction specified in the third column. "U.J." and "none" is the terminology used for unconditional jump and no jump respectively. IA refers to indirect addressing of RF.

TABLE 23

CS Micro-instruction Format and Feedback Parameter Specification

| ALU COMMANDS | Number of bits |
|---|---|
| ALU function selection (most combinations unused) | 5 |
| RF address | 5 |
| Indirect/direct address | 1 |
| Gating to Bus (decodes eight ways) | 3 |
| Total | 14 |

| MM$j$ COMMANDS | | Number of bits |
|---|---|---|
| MM commands; read, write, implied address (R/W) | | 4 |
| $j$ counter; count up, count down reset | | 3 |
| $j_i$ counter; count up, count down, reset | | 3 |
| $k$ counter; count up, reset | | 2 |
| CPU interrupt | | 1 |
| | Total | 13 |

| SM COMMANDS | | |
|---|---|---|
| $SR_o$; write "0", write "1" | | 2 |
| $Sr_t$; write "0", write "1" | | 2 |
| $SR_{=j}$; write "0", write "1" | | 2 |
| $SR_=$; enable, diable | | 2 |
| $CS_p$ preset address | | 4 |
| $CS_p$ preset enable | | |
| | Total | 13 |

| IT COMMANDS | | |
|---|---|---|
| Gate outputs from BUS | | 9 |
| Gate inputs to BUS (decodes eight ways) | | 3 |
| RF address | | 5 |
| Direct/Indirect address | | 1 |
| | Total | 18 |

| CS FEEDBACK PARAMETERS | | |
|---|---|---|
| MM ready, SM ready, SM negative (decoded) | | 4 |
| SM equality, $C_o$ = max ALU equality | | |
| ALU , ALU , U. J., none | | |

Five basic micro-routines constitute the sort algorithm. The functions performed by each of the micro-routines are respectively:

| | |
|---|---|
| $A_1$ | a. Initiate sort operation<br>b. Report status operation<br>c. Resume<br>d. Terminate |
| $A_2$ | Initial SM loading |
| $A_3$ | Locate the next desired key |
| $A_4$ | Tag manipulation and key replacement |
| $A_5$ | Replace a SM word and verify the key |

Each operation in the micro-routine is illustrated chronologically in flow charts of FIGS. 21A through 21E. The flow chart terminology should be self-explanatory. Superscripts refer to a subkey significance. Information transfer is indicated by an arrow; MM $P_i$ is the notation for, "transfer $P_i$ to MM". MM R (argument) translates to, "transfer the data specified by the argument, contained in Register R, to MM". Symbols assigned to each register are labeled in the figures. CS commands to MM are issued via $CS_2$. Read $_{MM}$ and Write $_{MM}$ is the flow chart terminology for the two $CS_2$ instructions. Each of the SM instructions are spelled out verbally. For example, Load $_{SM}$ Find $_{SM}$R (content search), Resume Find $_{SM}$R etc., are stated for each of the four SM instructions.

Figure 23:
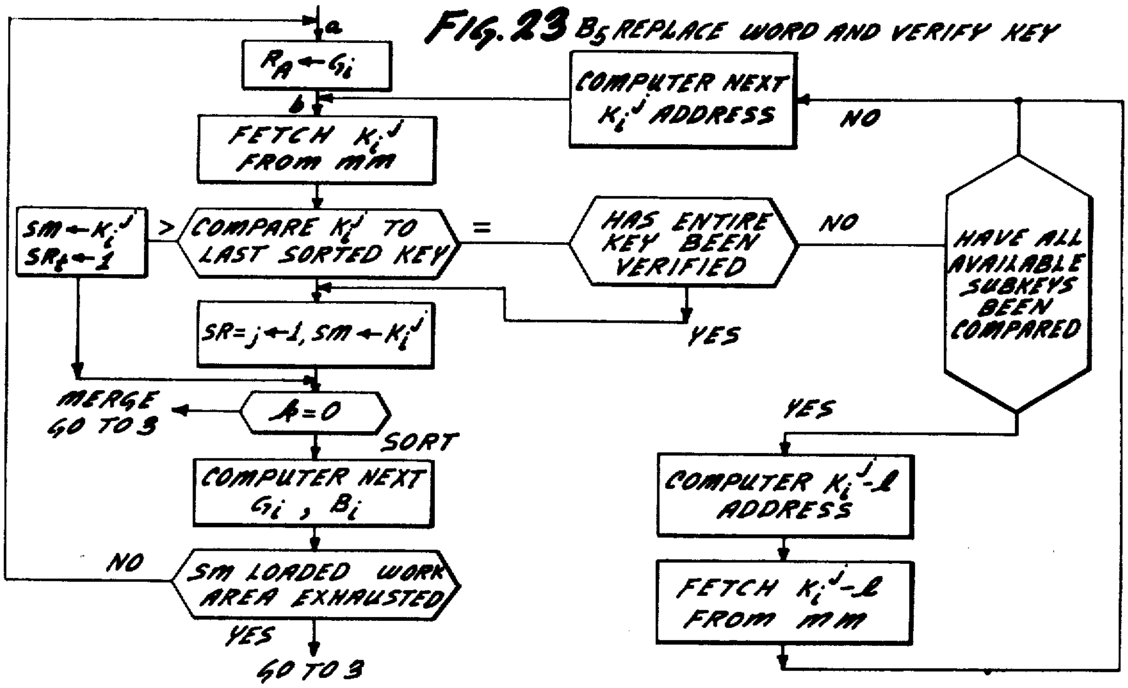
FIGS. 22 and 23 are flow charts showing more detail for the last two micro-routines of FIGS. 21D and 21E.
Figure 22:
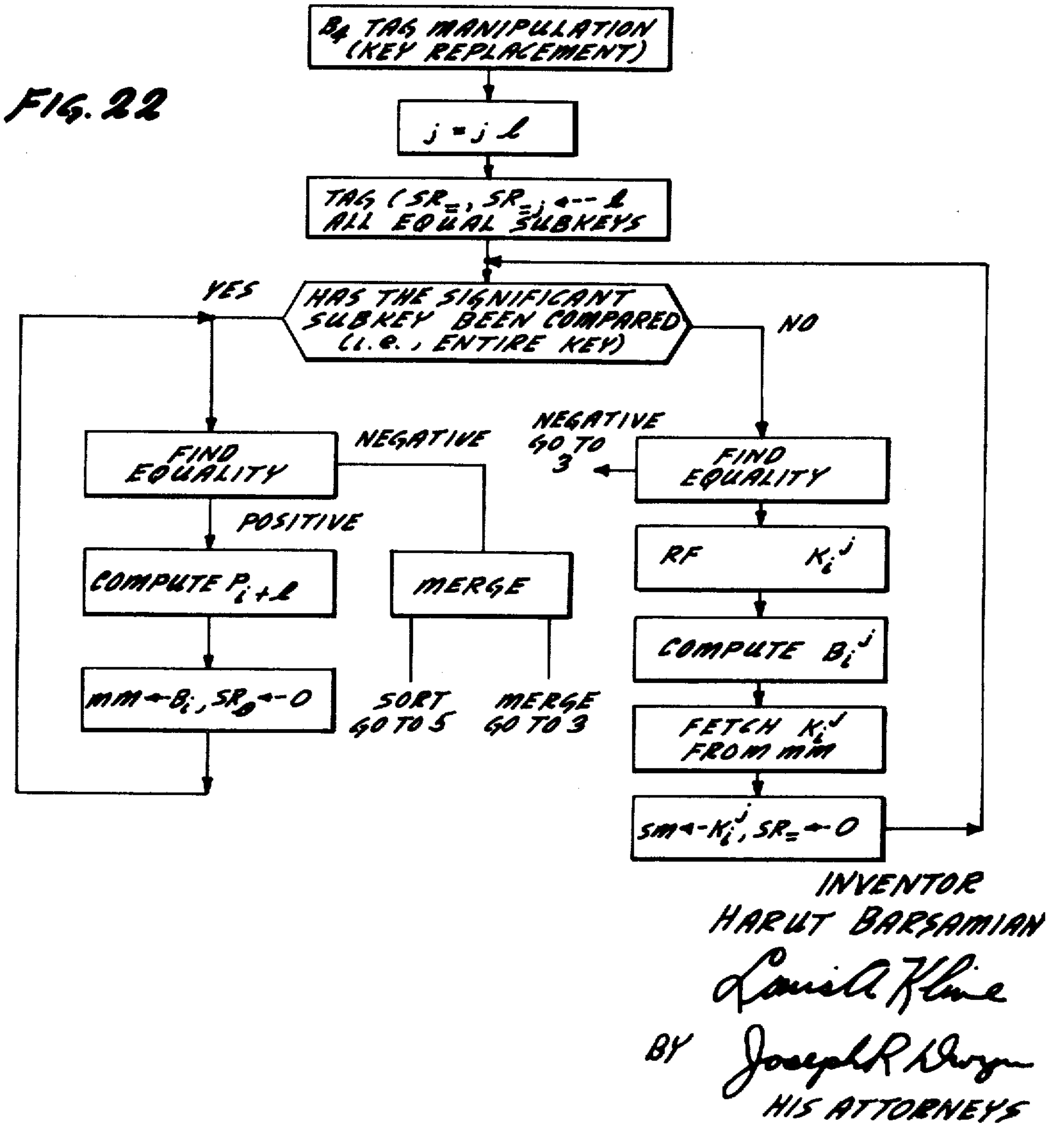

FIG. 21A through FIG. 21E are condensed flow charts of each micro-routine ($A_1$ through $A_5$) respectively, giving only the fundamental operations involved. The fourth and fifth micro-routines, due to greater complexity, are repeated in FIG. 22 and FIG. 23, showing an intermediate level of detail.

Further factors explanatory of the system of the present invention will be hereinafter discussed under the section on "Operation."

OPERATION

For purposes of discussion with respect to the operation of the Sort Processor System, a typical sort operation will be used as an example such as the commonly useful situation with regard to payroll records.

Assuming a payroll unit involving 5 thousand employees and the consequent records for each employee which would involve factors such as employee number, department number, social security number, hours worked, rate of pay and other meaningful data, the starting medium would be an item such as a punched card, for example, having the usual 80 character capability.

For purposes of illustration, it may be decided that sorting in ascending order is to be done with regard to the data specified as "employee number" and the data regarding the employee number for each card will be considered to be the "key word" for that particular record.

Now assuming one character to require eight binary bits, and one record to compose 80 characters, and assuming that we use a unit of one word which is equal to four characters, we find that one record will be the equivalent of 20 words.

The punched card data would normally be loaded into a peripheral unit such as a magnetic tape after which it could be used by the main memory as called for.

The overall system control for the architecture can be seen in FIG. 5 as the System Executive block, which allocates a portion of the main memory to be used for the storage of a group of records and words to be operated on. This portion of the main memory is designated as the "Work Area".

Assuming, for example, that the allowable allocation for the work area is a thousand records, then the system executive control will read a thousand records into the Work Area of the main memory from the magnetic tapes and leave the remaining four thousand records on the magnetic tape file.

By using the system executive program, the operator of the system would indicate that the length of each record is 80 characters and that the items of interest to be sorted are the employee number which is referenced by the characters which are located in columns 13 through 18 of the punched cards and that these particular set of characters will constitute the "key" or "key word" for each record.

It will be assumed that the work area in this case is limited to one thousand records or twenty thousand words, and this is established by the executive system executive program block. Further the system executive block will retain the information of the first address location of the work area. This first address location is an address code which is designated as $B_o$.

Assuming a total main memory capability of 32,768 words, it will be required that each location in memory be referenced by an address which is made of 15 bits to specify that given address. Thus $B_o$ is basically an address word composed of 15 binary bits.

The system executive program stores the information of the initial address for the first record which has been read into memory; and $B_o$ represents the initial address of the location for the first record and $B_n$ represents the initial address of the location for the one thousandth or final record. The main memory is allocated into portions which provide a portion for the work area, a portion for the "string list" to be described later, a portion for the storage of initial parameters as a table of information, and of course the resident portion allocated for the executive system program.

The executive program, based on information from the operator of the system, will allocate a portion of main memory designated as the Initial Parameters Table for storage of the following information:

a. The $B_0$ which is the address of the initial location in the work area for the first record.

b. The $B_n$ which is the address of the initial location for the final record located in the work area.

c. The L or length of the key word in terms of characters, in this case six characters to represent the employee number.

d. The $G_0$ which provides for location of the key word within the first record, in this case being the characters 13 through 18.

e. The $P_0$ which is the initial address of that portion of the main memory known as the "string list" which is the storage for items processed out of the work area or input buffer into the output buffer or string list.

f. The $P_m$ which is the final location address of the "-string list".

g. The *r* which is the length of the record in main memory words, which in this case is 20 characters.

When the above has been accomplished, the executive program sends a command to the Sort Processor by means of an instructional control word. The control word is an instruction in coded form which has two portions, the first portion being a function code which gives the instruction to "sort in an ascending mode", and the second portion which is $A_0$, representing the address of the initial location of the Initial Parameters Table, and is a 15 bit binary code.

Upon receipt of the control word the Sort Processor will take all the data in the Initial Parameters Table and store them in the RF or Register File of the Sort Processor.

As may be observed in FIG. 3, the Sort Processor then reads the first record Key Word from the address location $G_0$ and stores it in the search memory of FIG. 2 in the very first location of the search memory. As seen in FIG. 2 the search memory is divided into two sections, one section being for Key Word and the other for address data. In other words, the key portion stores the data contents of the Key Word of the first record in the initial location of the search memory, it stores the Key Word of the second record in the second location of the search memory and so on. It should be noted that the Key Word of each record has also associated with it in its particular location, the $B_0, B_1 \ldots B_n$ which in each case is the associated initial address of that record with reference to the work area location.

Now by using the operation of incrementing the $G_0$ (address of the Key Word of the first record in the word area) by the number L, which is the number of words in the record, the resultant operation is to get the address of the next record's Key Word.

Since there are 20 words in a record, then by taking $B_0$ and incrementing it by the number 20, we get the $B_1$ which is the initial address of the next succeeding record in the work area. Then taking $B_1$ and incrementing this by 20, we get $B_2$ which is the initial address of the next succeeding record.

Since G gives the address of Key Words, the Search Memory then can be made to store the data content of the Key Word of each record in the Search Memory in a consecutive locational order.

Thus with the loading of the Search Memory being completed, the "sort" operation can begin and it is at this time that the Micro-Program Storage Unit takes charge and puts forth the instruction to the Search Memory of "get me the next lowest Key Word".

The next system function to be performed here is done under control of the Micro-Program Storage Unit which seeks to determine the lowest Key Word residing in the Search Memory in order to establish a starting point (or base reference point, which will be called "-base key word").

In this particular situation the lowest "Key Word" is to be chosen for the "base key" since we are looking for the sorting process to be accomplished in ascending order. Reference to FIG. 2B will show how the search memory has an appended portion designated as RA (or Register A) and RB (or Register B), these registers having between them another unit designated as the Comparator. These registers are basically buffer registers and thus also provide for a buffering action.

The Sort Processor, after receiving the control word then accomplishes the following actions:

1. it takes a reading of the Initial Parameters Table starting from the address $A_0$ and stores it in its Register File (RF).

2. it generates the effective addresses of the consecutive keys of the records in the work area by computing $G_i = G_0 + ir$ starting with $i = 0$ and subsequently incrementing $i = 1, 2, 3, \ldots n$.

3. it reads the Key Words ($K_i$ where $i$ goes from 0 to $n$), and further generates the initial addresses of each record ($B_i = B_0 + ir$) and stores the codes $K_i$ (Key Word) concatenated with the initial addresses ($B_i$) in consecutive locations of its Search Memory (SM), so that in the initial loading, the Search Memory will be filled at the point where i is less than n, since the capacity of the Search Memory generally can be smaller than the number of records, and consequently the number of Key Words residing in the work area of the main memory.

4. it locates the first desired (in this case the lowest) key word ($K^o$) from the Search Memory and stores the corresponding address $B^o$ in the $P_0$ location.

With regard to this step and with reference to FIG. 2B, the sequence is such that the first Key Word is read into register A, then when the second key word is being transferred into register A the previous key word is transferred into register B so that register B will hold the first key word at the same time that the register A is holding the second key word from the main memory. At this moment and according to its instructions, the Comparator will compare the key words in register A with that of register B in order to select which of these words is the lower key number. The lower of the two compared Key Word numbers is kept in Register B, while at the same time the prior contents of register A are in each case stored into the Search Memory. As the result of the sequential reading of the work area of the main memory through Register A, Register B, the Comparator and the storage of data into the Search Memory, there will finally remain in Register B the lowest key number of that group of data read out from the work area of the main memory. This smallest Key Word is known as the "Base Key". The Sort Processor thus locates the desired lowest key ($K^o$) and stores its corresponding address $B^0$ in the location designated $P_0$. Subsequently the "Base Key" is transferred from Register B to Register A.

Once the base key word number is established in register A the Micro-Program Storage Unit instructs the Search Memory to get the next highest key word number located in the Search Memory. It does this by an incrementation process by which the base key in register A is incremented by "one" and the Search Memory is searched to see whether any of the Key Words located therein match the "base key plus one". If no match is found, then the base key is incremented by "two", and a search is made in the Search Memory to see if a match can be found. If the Comparator detects an equality, then the address $B^j$ corresponding to the detected Key Word is removed from the Search Memory and sent on to the string list where it is stored as an address. Thus the string list accumulates a list of initial addresses of records residing in the work area of the main memory starting at the first location $P_0$ for the lowest (base key); then the next lowest key word number's address is placed in the second location at $P_1$ and so on until the string list is filled with addresses from the top to the bottom, which addresses represent the Key Words which have been put into ascending order.

5. the Sort Processor replaces any vacancy in the Search Memory with the next set of key word data ($K_i + 1$) and its associated address position ($B_i + 1$) which is residing in the work area.

6. the sort processor searches for the next desired key by using, in general form, the key $K^{j-1}$ located at the previous ($j-1$) cycle as the base key for the comparison, and stores the address $B^j$ corresponding to the newly located key word $K^j$ into the location of $P_j$ of the string list.

The processes involved in steps 5, 6 and above are iterative and continue until the parametrical conditions are fulfilled; these may be where address $B_i$ is $= B_n$, thus indicating that the work area is exhausted; or where the address $P_j$ is $= P_m$ (where $j = m$) which indicates that the string list locations are exhausted; or that no more successful searches in the Search Memory are possible, for example, where the search memory does not contain any more keys that are greater than the current base key.

While the above described steps are discussed in terms of making an "ascending" sort by means of incrementing a "base key" in terms of single incrementing steps, it should also be realized that it is possible to do a "descending" sort wherein the "base key" would be the highest number Key Word in conjunction with a decrementing operation to establish a descending sorting operation. Other functional operations on data are likewise possible.

At this point the Sort Processor sends an interrupting signal to the central processing unit (CPU) and remains in an idle state until a new control word is received. In the particular case at hand assuming the first thousand records being handled in the work area (and since the Search Memory may have a capacity of only two hundred and fifty-six Key Words), the data which has been taken from the work area through the Search Memory and string list and has been placed in proper ascending order can now be disposed of by placing it into a peripheral unit such as a disc file or magnetic tape and thus free the system for handling the remaining data in the work area which has not yet been handled.

Thus, one string of sorted data will now have been placed in a peripheral memory device; afterward, other groups of data from the work area will be handled by the previously described system in order to generate other strings of sorted data into the peripheral area.

At this stage there is only a partial sort of the overall data since there may now reside, for example, four strings of sorted data sorted only with respect to that particular string but not sorted with respect to the overall body of data.

At this point a combination sort/merge operation is used wherein two or more groups of sorted strings are taken from a peripheral file and fit into the system to merge and sort the various items in the strings being handled. In this operation another micro-program routine in the Micro-Program Storage Unit is set into play to take in two or more strings of data, run them through the Sort Processor Search Memory and place them in the string list to form a more highly refined sort list. This operation takes considerably less time since the items of data are already partially sorted, after which the newly refined string list will be read out into peripheral memory wherein it may be used for the purpose of activating and controlling a print out from main memory in order to provide the actual end-result data which had been desired, and which in this case, was a sort of employees by "employee number".

It will be obvious that a considerable number of configurations and apparatus may be arranged to make use of the above described system, and consequently there is set forth herein the following appended claims to define the scope of the invention.

What is claimed is:

1. In a data processing system, the combination comprising:

a. a main memory for storing raw data to be processed;

b. a sort processor cooperating with said main memory, said sort processor including a search memory for holding data to be processed and for performing the sorting functions, a register file holding data representing parameters selected for the data processing operation, and a micro-program storage unit for storing replaceable control routines for the sort processor and for its data exchange with external units;

c. a central processor unit connected for cooperative communication and control of said main memory and said sort processor;

wherein said sort processor functions completely independent of the central processor unit except for the use of a start signal and wherein all sort algorithms are stored in the sort processor thus rendering it independent of the central processor unit.

2. The data processing system as in claim 1 wherein said micro-program storage unit includes: a memory control section for control routines for handling data in said main memory, a search control section for controlling search operations in said search memory, and a main control store which contains all the required sort-merge algorithms and all of the overall sort processing system control micro-routines 3. The data processing system as in claim 1 wherein said search memory provides storage for selected key word data taken from data records in said main memory, and provides storage for address-data which references each key word data to the address location of data records held in said main memory.

4. The data processing system as in claim 1 wherein said sort processor includes at least two comparators and two registers working in cooperation with said search memory for comparing: a set of at least two key words from said search memory, or the key word currently fetched from said main memory with a base key word, said comparing being capable of occurrence during the time that said sort processor is performing a sequential search through said memory, in order to select a base reference key word for compiling an address list in an output buffer of said main memory.

5. The data processing system as in claim 4 wherein said main memory includes: an input buffer work area for storage of data records to be processed, each of said data records having a main memory address associated therewith; an output buffer string list area for sequential storing of starting addresses of records processed by the sort processor; and an initial parameters table area for establishing parametrical data for controlling the scope of the data processing operations, the said initial parameters table, specified by the starting address, $A_0$, being used by the sort processor which sequentially reads the entire initial parameters table.

6. The data processing system as in claim 4 wherein said central processor unit initiates operations of the sort processor by use of a control word, said control word comprising: a function code for selecting the data processing function to be performed by the sort processor, and a main memory address referencing the starting location $A_0$ in the said initial parameters table area.

7. The system as defined in claim 1 including an external data storage unit wherein said sort processor and central processor unit share the main memory and wherein the sort processor is given a lower priority of access to the main memory than the central processor unit.

8. The system as in claim 7 wherein the said sort processor and the said central processor unit share the said external storage unit, and wherein the sort processor controls the data transfer between the external storage unit and the main memory only during a sort-merge operation.

9. The system as in claim 1 wherein the main memory is constituted of two physically separate main memory sections and wherein the central processor unit has exclusive access to both sections of the main memory while the sort processor has an exclusive access to only one section of the main memory.

10. The system as in claim 9 wherein said sort processor and said central processor unit share a common external storage unit.

11. The combination as defined in claim 1 wherein said micro-program storage unit comprises a control store in the sort processor which is dynamically alterable and capable of being reloaded from the main memory or any other source of micro-programs thus permitting the implementation of sort-merge algorithms.

12. The data processing system of claim 1 in which the micro-program storage unit comprises a control store partitioned into three separate sections on a functional algorithmic basis so that the sort-merge algorithm is stored in a first control store, the search memory control algorithm is stored in a second control store, and the main memory control algorithm is stored in a third control store, such sectional structure providing for: the minimization of total control store capacity requirements, suitability of implementation with LSI components, more efficient debugging and maintainability capability.

13. A sort processor interconnected for cooperation with a central processor unit and a main memory, said sort processor comprising: a search memory, a register file, a micro-program storage unit, and at least two registers and two comparators cooperating with said search memory for sorting and merging new data records according to parameters stored in said register file, and to a sort-merge algorithm stored in said micro-program storage unit of the said sort processor as firmware.

14. In a data processing system including a main memory, a central processor unit and a sort processor, the method of processing data comprising the steps of:

a–1. allocating portions of main memory for an input buffer, for an output buffer, and for an initial parameters table;

a–2. storing raw data records into the input buffer, and storing parameter data into said initial parameters table;

a–3. establishing (a–3.1) an address $A_0$ for the first location of the parameter data in said initial parameters table; establishing (a–3.2) addresses $B_0$ and $B_n$ for the first and last data records in said input buffers; (a–3.3) establishing an address $G_0$ for a selected key word of the first record of said data records in said input buffer; and (a–3.4) establishing addresses $P_0$ and $P_n$ for the first and last addresses in said output buffer;

a–4. initiating the sort processor, by using a start signal generated by the central processing unit to inform the sort processor that a function code control word is now available on the main memory bus;

a–5. transferring data from said initial parameters table in said main memory to a register file in said sort processor;

a–6. transferring key words $K_i$ starting with the first record in the input buffer area from a location designated $G_i$ into a search memory in said sort processor;

a–7. establishing a key word reference base $K^o$ according to an instruction from the control word and the initial parameters table;

a–8. computing the address $B_i$ of the next key word corresponding to each key word $K_i$, and storing the computed $B_i$ and $K_i$ in the sequential locations of the search memory as one word;

a–9. searching for the highest or lowest key word from the contents of said search memory;

a–10. writing the corresponding address $B^o$ of the base $K^o$ into the first address $P_0$ location of the said output buffer;

a-11. operating upon said base $K^o$ according to an incrementing or decrementing function as required to establish sequential bases $K^n$;

a-12. comparing each key word in said search memory sequentially with each subsequent base $K^n$ to identify a selected relationship which when found causes transfer of the address $B^n$ of said identified key word $K^n$ into the $P_n$ location of said output buffer;

a-13. replacing the removed key word data in said search memory with new unprocessed key word data from said input buffer;

a-14. processing said data until any one of the following conditions are met: (a-14.1) all the available key word data in the input buffer are processed, (a-14.2) the output buffer area is completely filled, (a-14.3) searches for the current string are exhausted;

a-15. interrupting the central processor unit and making the sort processor wait for a new control word.

15. The process of claim 14 including the steps of: (a-16) transferring the records from the input buffer area to an external storage area by the sequentially arranged list of addresses ($B_n$) of the output buffer area and further loading new raw records to be sorted into the input buffer area; and (a-17) restarting the sequence from step (a-1) of claim 14.

16. The process of claim 15 including the steps of: (a-18) accumulating a plurality of strings of sorted data records in an external storage resulting from the sequences of claims 14 and 15; and (a-19) merging said strings of data records from said external storage through said sort processor to accumulate a complete sorted list of data records.

17. The process of claim 16 including the step of: (a-20) reading out the sorted records of the completed sorted list from external storage in order to establish a read-out of the actual list of records sorted by the specified key word.

* * * * *